US007606210B2

(12) United States Patent
Ratiu et al.

(10) Patent No.: US 7,606,210 B2
(45) Date of Patent: Oct. 20, 2009

(54) SYSTEM AND METHOD FOR MESSAGE CONSOLIDATION IN A MESH NETWORK

(75) Inventors: Ovidiu Ratiu, Atlanta, GA (US); Marius Ovidiu Chilom, Mableton, GA (US); Ion Ticus, Bucharest (RO)

(73) Assignee: NIVIS, LLC, Atlanta, GA (US)

( * ) Notice: Subject to any disclaimer, the term of this patent is extended or adjusted under 35 U.S.C. 154(b) by 969 days.

(21) Appl. No.: 10/938,283

(22) Filed: Sep. 10, 2004

(65) Prior Publication Data

US 2006/0056456 A1  Mar. 16, 2006

(51) Int. Cl.
*H04L 12/28* (2006.01)
(52) U.S. Cl. .................. 370/338; 370/254; 370/537
(58) Field of Classification Search ................ 370/473
See application file for complete search history.

(56) References Cited

U.S. PATENT DOCUMENTS

| | | | |
|---|---|---|---|
| 5,465,389 A | 11/1995 | Agrawal et al. | 455/33.2 |
| 5,588,038 A | 12/1996 | Snyder | 379/57 |
| 5,673,252 A * | 9/1997 | Johnson et al. | 370/449 |
| 5,686,886 A | 11/1997 | Stensney | 340/539 |
| 5,714,931 A | 2/1998 | Petite et al. | 340/539.17 |
| 5,805,594 A | 9/1998 | Kotchey et al. | 370/401 |
| 5,841,365 A | 11/1998 | Rimkus | 340/825.35 |
| 5,926,103 A | 7/1999 | Petite | 340/825.19 |
| 5,926,531 A | 7/1999 | Petite | 379/144.04 |
| 6,028,522 A | 2/2000 | Petite | 340/641 |
| 6,044,062 A | 3/2000 | Brownrigg et al. | 370/238 |
| 6,115,750 A | 9/2000 | Dillon et al. | 709/235 |
| 6,218,953 B1 | 4/2001 | Petite | 340/641 |
| 6,233,327 B1 | 5/2001 | Petite | 379/155 |
| 6,249,516 B1 | 6/2001 | Brownrigg et al. | 370/338 |
| 6,396,839 B1 | 5/2002 | Ardalan et al. | 370/401 |
| 6,430,268 B1 | 8/2002 | Petite | 379/39 |
| 6,437,692 B1 | 8/2002 | Petite et al. | 340/540 |
| 6,546,260 B2 | 4/2003 | Esmailzadeh et al. | 455/522 |
| 6,604,146 B1 | 8/2003 | Rempe et al. | 709/238 |
| 6,609,002 B1 | 8/2003 | Krishnamurthy et al. | 455/428 |

(Continued)

OTHER PUBLICATIONS

International Search Report and Written Opinion for PCT/US05/31797.

(Continued)

*Primary Examiner*—Phuc H Tran
(74) *Attorney, Agent, or Firm*—Thomas, Kayden, Horstemeyer & Risley, LLP

(57) ABSTRACT

A system and method for consolidating messages in a network comprising an access node coupled to a computer and a plurality of radio nodes coupled to sensing devices, such as a utility meter, is disclosed. Inbound message consolidation includes a radio node receiving two or more inbound messages that are consolidated. The radio node wirelessly transmits the consolidated message to a radio node logically closer to the access node or directly to the access node if the access node is within the transmission range of the radio node. The access node extracts the individual messages from the consolidated message upon receipt. For outbound messages, the access node consolidates original messages having common routes and transmits the consolidated message to a last node in the common route. The last node in the common route splits the consolidated message into the original messages and transmits each one to a destination radio node.

6 Claims, 25 Drawing Sheets

U.S. PATENT DOCUMENTS

| | | | |
|---|---|---|---|
| 6,643,273 B2 | 11/2003 | Chao | 370/316 |
| 6,735,630 B1 * | 5/2004 | Gelvin et al. | 709/224 |
| 6,747,981 B2 | 6/2004 | Ardalan et al. | 370/401 |
| 6,842,430 B1 | 1/2005 | Melnik | 370/254 |
| 6,934,916 B1 * | 8/2005 | Webb et al. | 715/772 |
| 7,145,892 B2 * | 12/2006 | Quinn et al. | 370/338 |
| 2001/0002210 A1 | 5/2001 | Petite | 379/155 |
| 2001/0024163 A1 | 9/2001 | Petite | 340/628 |
| 2002/0012323 A1 | 1/2002 | Petite et al. | 370/252 |
| 2002/0013679 A1 | 1/2002 | Petite | 702/188 |
| 2002/0019712 A1 | 2/2002 | Petite et al. | 702/61 |
| 2002/0019725 A1 | 2/2002 | Petite | 702/188 |
| 2002/0027504 A1 | 3/2002 | Davis et al. | 340/540 |
| 2002/0031101 A1 | 3/2002 | Petite et al. | 370/310 |
| 2002/0125998 A1 | 9/2002 | Petite et al. | 340/286.01 |
| 2002/0150094 A1 * | 10/2002 | Cheng et al. | 370/389 |
| 2002/0169643 A1 | 11/2002 | Petite et al. | 705/5 |
| 2003/0036810 A1 | 2/2003 | Petite | 700/9 |
| 2003/0036822 A1 | 2/2003 | Davis et al. | 700/295 |
| 2003/0039248 A1 | 2/2003 | Weaver | 370/392 |
| 2003/0133468 A1 | 7/2003 | Haulk et al. | 370/442 |
| 2003/0135772 A1 | 7/2003 | Haulk et al. | 713/324 |
| 2003/0135805 A1 | 7/2003 | Haulk et al. | 714/748 |
| 2003/0135806 A1 | 7/2003 | Haulk et al. | 714/749 |
| 2003/0151513 A1 * | 8/2003 | Herrmann et al. | 340/573.1 |
| 2003/0152041 A1 | 8/2003 | Herrmann et al. | 370/310 |
| 2005/0254472 A1 | 11/2005 | Roh et al. | 370/338 |
| 2005/0259580 A1 | 11/2005 | Osterloh et al. | 370/231 |
| 2005/0265259 A1 | 12/2005 | Thubert et al. | 370/255 |
| 2006/0007882 A1 | 1/2006 | Zeng et al. | 370/328 |
| 2009/0135750 A1 * | 5/2009 | Ratiu et al. | 370/310 |

OTHER PUBLICATIONS

International Search Report and Written Opinion for PCT/US05/32353.

International Search Report and Written Opinion for PCT/US05/32432.

International Search Report and Written Opinion for PCT/US05/32433.

* cited by examiner

SYSTEM AND METHOD FOR MESSAGE CONSOLIDATION IN A MESH NETWORK

TECHNICAL FIELD

This disclosure generally pertains to wireless communications and, more particularly, to a system, method, and apparatus for meshing a network of wireless devices.

BACKGROUND

The monitoring and controlling of devices located remotely from a central location has historically provided many challenges. The ability to detect a condition at a remotely located position or to exercise control over a system (such as turning a device off and on) from a central location has oftentimes been limited by the distance of the central control location from the device that is monitored or controlled. For example, monitoring and controlling devices within a manufacturing facility or a power plant may be accomplished by hardwiring the sensors and controllers with monitors and controllers in the central control room that may be only a few hundred feet away. However, hardwired monitoring and controlling of devices in areas wherein the remotely located sensors and controllers are positioned miles away from the central control area instead of feet becomes impractical due to the inability to communicate electrical control signals between the central control room and the remotely located sensor or controller.

As an example, utility meters for electricity, gas and water located at residential homes dispersed in a geographical area have historically collected data locally. But to collect that data, utility personnel have had to physically travel to each utility meter throughout the geographic dispersal of meters to physically read the meters' data.

However, in recent years, efforts have been made to develop automatic meter reading systems for utility meters such as electricity, gas and water meters that avoid meter reading personnel physically inspecting each individual meter within the geographic area of meters. Some such systems incorporate low powered RF transceivers in the meters that broadcast system information, such as consumption data. Thus, the broadcast area may be such that meter reading personnel may drive near the location of the individual meter to collect any data stored in the meter. As a nonlimiting example, meter reading personnel may drive along a street of houses with meters equipped with such RF transceivers that communicate with transceivers in the personnel's vehicle. The mobile transceivers collect and store consumption information and other data received from the broadcasting utility meters.

However, a problem with this configuration is that data is collected from an individual meter in the geographic area of meters when the utility personnel comes within the broadcast range of the individual meters at each location. While this is an improvement over utility personnel having to physically inspect and read each individual meter, the problem of this configuration is that it still relies on a human for data collection. Stated another way, the data collection process retains at least one manual step.

In an effort to move meter reading to a completely automated process, several approaches have been advanced. One proposal involves an arrangement in which communication with, for example, electric meters, is carried out using the power transmission line coupled to the individual residence or commercial location. In this nonlimiting example, communication takes place across the power line, and the central location polls the remotely located meter periodically. However, difficulties in communicating the data across the same line that carries high voltage electricity has encountered many difficulties, thereby making this approach less practical. Plus, in this nonlimiting example, other types of meters, such as water and gas meters, are not coupled to the network, due to the fact that these are separate systems. So this solution is limited, at best.

Additional attempts have included installing modems and other communication devices in the remotely located meters that couple to phone lines and other communication links in the residence or commercial location. As a nonlimiting example, such a modem may connect to the homeowner's telephone line to periodically communicate usage data and other information over a publicly switched telephone network to a modem at the central monitoring and control location. However, the problem with this proposal is that it involves other parties, such as a telephone company, for implementing the system and also suffers from a lack of priority. For example, when the homeowner is using the telephone line, the modem in the meter cannot acquisition the line. Requiring utility consumers to procure second telephone lines for meter communication is impracticable and still suffers from the fact that reliance on other parties is required.

Various types of wireless proposals have been advanced as solutions to this problem. One such proposal involves providing each utility meter with the capability of wirelessly communicating with other utility meters within a predetermined communication range. However, these wireless communication proposals suffer from several drawbacks and inabilities. For example, while a number of meters may communicate with each other due to the relatively close proximity of their respective locations, getting the data back to the central monitoring and control location has proven to be yet another obstacle. Solutions have included locating a portal or other type of data gathering device near each individual meter and communicating data back to the central monitoring and control location. This limitation has previously meant that a data gathering device must be located within the short communication range of each wireless transceiver, or that separate repeaters must be used to repeat the data from the remotely located meters to the portals so that each meter can communicate its data up the chain to the central location.

These types of solutions have also been plagued by communication problems, including bottlenecks and breakdowns in the chain. Battery and memory concerns render some remotely located meters inaccessible, thereby resulting in a system where all meters within a given geographical area cannot be included in the communication network.

Consequently, the inability to network the various geographically distributed meters into an integrated system wherein data can be monitored and also controlled from a central location has caused some of the inferior solutions discussed above to be implemented, such as requiring meter reading personnel to drive through areas where meters are equipped with limited broadcast capabilities. Moreover, the prohibitive costs associated with installing a great number of portals and/or repeaters in an area so that each individual utility meter can be networked has stymied the development of wireless automatic meter reading networks.

As a result, a heretofore unaddressed need exists to overcome the deficiencies and shortcomings described above.

DESCRIPTION OF THE DRAWINGS

Many aspects of the disclosure can be better understood with reference to the following drawings. The components in the drawings are not necessarily to scale, emphasis instead being placed upon clearly illustrating the principals described in this disclosure. Moreover, in the drawings, like reference numerals designate corresponding parts throughout the several views.

DETAILED DESCRIPTION

In addition to the drawings discussed above, this description describes one or more embodiments as illustrated in the above-referenced drawings. However, there is no intent to limit this disclosure to a single embodiment or embodiments that are disclosed herein. On the contrary, the intent is to cover all alternatives, modifications, and equivalents included within the spirit and scope of this disclosure and as defined by the appended claims.

A system and method for consolidating messages in a mesh network comprising an access node and a number of radio nodes is disclosed. Inbound message consolidation includes a radio node receiving two or more inbound messages that are consolidated. The radio node wirelessly transmits the consolidated message to a radio node logically closer to the access node or directly to the access node if the access node is within the transmission range of the radio node. The access node extracts the individual messages from the consolidated message upon receipt. For outbound messages, the access node consolidates original messages having common routes and transmits the consolidated message to a last node in the common route. The last node in the common route splits the consolidated message into the original messages and transmits each one to a destination radio node.

Figure 1:
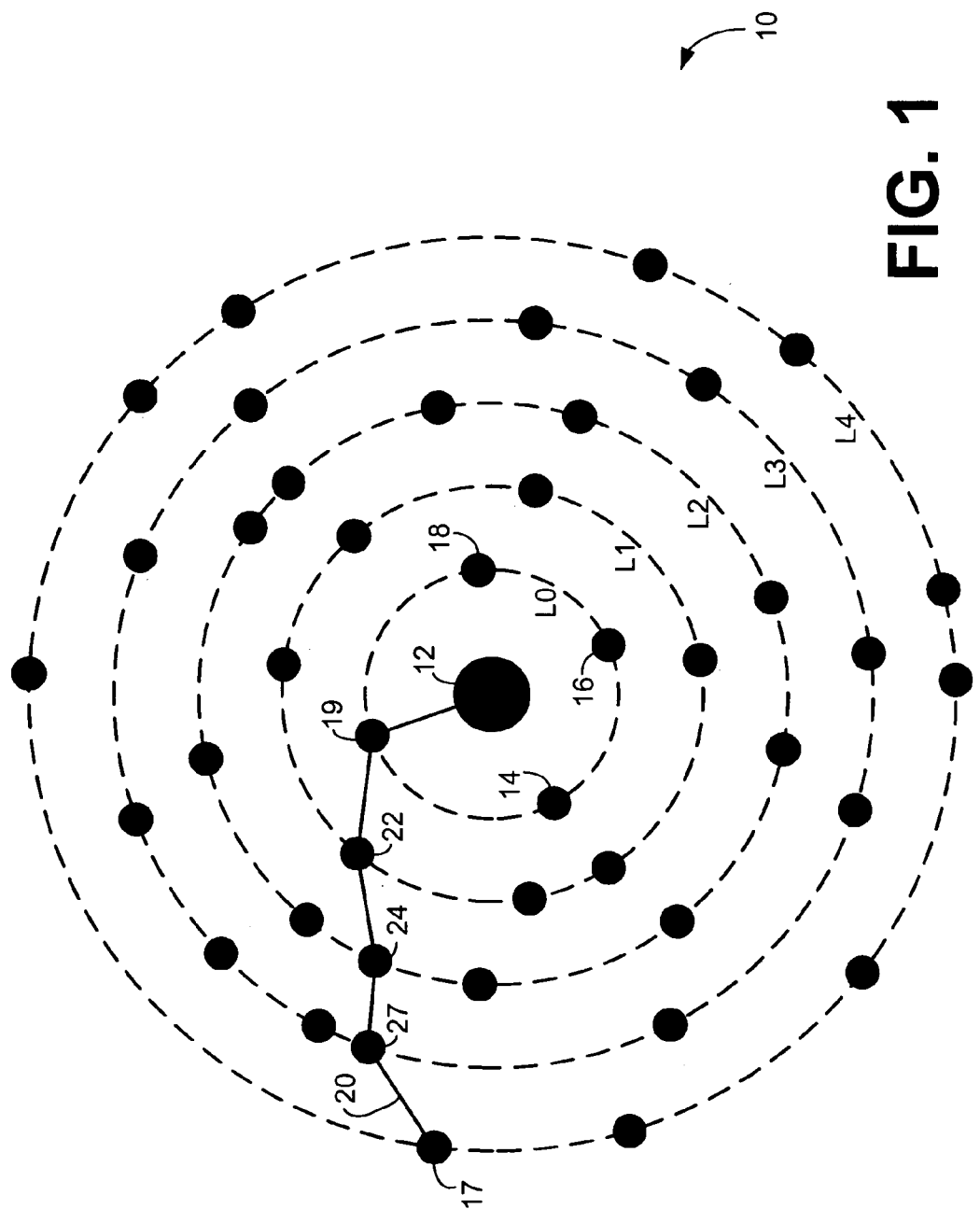
FIG. 1 is a diagram of the mesh network with an access node and a plurality of radio nodes.

FIG. 1 is a diagram of mesh network 10 comprising access node 12 and a number of radio nodes, such as radio node 14. The radio nodes may be randomly placed but logically grouped around access node 12 which acts as a controller for the group and also as a gateway to a back end system (see FIG. 18). Access node 12 may be coupled by a wide area network 359 (FIG. 18), such as the Internet, to the back end system 360 (FIG. 18) that may be furthermore coupled to a central data monitoring, collection, and/or control area (such as units 362 and 364 of FIG. 18).

Each radio node (such as radio node 14) can communicate with access node 12 either directly or indirectly through other radio nodes. In this nonlimiting example, the radio nodes are logically grouped in layers in correspondence to the number of links to communicate with access node 12. Thus, in this nonlimiting example in FIG. 1, radio nodes 14, 16, 18, and 19 are on layer 0 because those radio nodes have a direct bidirectional link with access node 12.

Each of nodes 14, 16, 18, and 19 may wirelessly communicate via an RF modem (or other communication means, as known in the art) that is configured to communicate two ways via RF links, as one of ordinary skill in the art would know. Furthermore, each radio node includes an RF modem and one or more application dependent devices that perform functions such as the following nonlimiting examples: data acquisition, information display, power up, etc. Thus, as a nonlimiting example, radio nodes, such as radio node 14, may be coupled to an electric meter, gas meter, water meter, or other monitoring device such that data that is monitored and collected may be communicated by the radio node to access node 12 for communication to the back end system. Likewise, the radio nodes may be coupled to controlled devices, such as a pump, which may be turned on and off by the radio node upon an instruction communicated by the access node 12.

As indicated above, radio nodes 14, 16, 18, and 19 are located on layer 0 and may communicate directly with access node 12. In at least this nonlimiting example, as shown in FIG. 1, these radio nodes 14, 16, 18, and 19 are the only radio nodes in FIG. 1 that may communicate directly with access node 12 because access node 12 is within the communication range of each radio node 14, 16, 18, and 19.

The remaining radio nodes in mesh network 10 are positioned such that their respective transmissions cannot be received by access node 12. Similarly, transmissions from access node 12 cannot be received by the remaining radio nodes. Therefore, not only do radio nodes 14, 16, 18, and 19 serve as devices for forwarding information that is collected at that logical location, but those radio nodes also repeat wireless transmissions received from the other radio nodes in mesh network 10.

In this nonlimiting example, mesh network 10 contains five layers, which include layer 0, layer 1, layer 2, layer 3, and layer 4. The various radio nodes are logically located on each of these five layers. But as indicated above, just radio nodes 14, 16, 18, and 19 have a direct bidirectional link with access node 12, as they reside on logical layer 0.

The other radio nodes use a nearby radio node on a logical layer that is closer to the access node 12 for communicating with the access node 12. Radio nodes on layer 1 communicate with radio nodes on layer 0 in order to communicate with the access node 12. Radio nodes on layer 2 communicate with radio nodes on layer 1 to communicate with the access node 12. Layer 3 radio nodes communicate with layer 2 radio nodes, and layer 4 radio nodes communicate with layer 3 radio nodes.

As a nonlimiting example, radio node 22 on layer 1 communicates with access node 12 via radio node 19, which serves as a repeater for communications between access node 12 and radio node 22. To communicate, radio nodes 22 and 19 are placed within each other's communication range.

In similar fashion, one or more radio nodes on layer 1 may serve as a repeater for the radio nodes on layer 2. Furthermore, radio nodes on layer 2 may serve as repeaters for the radio nodes on layer 3. Finally, the radio nodes on layer 3 may serve as repeaters for one or more of the radio nodes on layer 4.

It should be noted that the various layers of the mesh network 10 do not necessarily correspond to an individual node's distance from access node 12 or any other radio node. Instead, a layer is denoted as logical space and is not necessarily a physical grouping of radio nodes. As a nonlimiting example, radio nodes on the same layer can actually be located at varying physical distances from the access node and may not necessarily be grouped together, but may still have the same number of hops or repeats to the access node 12. Nevertheless, a communication bidirectional link may be established between any radio node and the access node 12 of the mesh network 10.

As a nonlimiting example, communication path 20 may be established from radio node 17, which is on layer 4, to access node 12. In this nonlimiting example, radio node 17 communicates with radio node 27 on layer 3, which also communicates with radio node 24 on layer 2. Radio node 24 on layer 2 communicates with radio node 22 on layer 1 which itself communicates with radio node 19 on layer 0. As discussed above, radio node 19 communicates directly with access node 12 such that bidirectional link 20 may be established through the repeated hops or transmissions through radio nodes 19, 22, 24, and 27. This bidirectional link 20 enables data to be communicated between radio node 17 and access node 12.

As discussed in more detail below, a radio node attempts to minimize its distance number by preferring shorter routes to longer routes, thereby placing itself as logically close as possible to access node 12 in terms of the number of repeats or hops for communicating with access node 12. In this way, each of the radio nodes of mesh network 10 may be bidirectionally linked with access node 12 through the radio nodes logically located on a lower level, thereby creating the mesh network 10 of FIG. 1.

Figure 2:
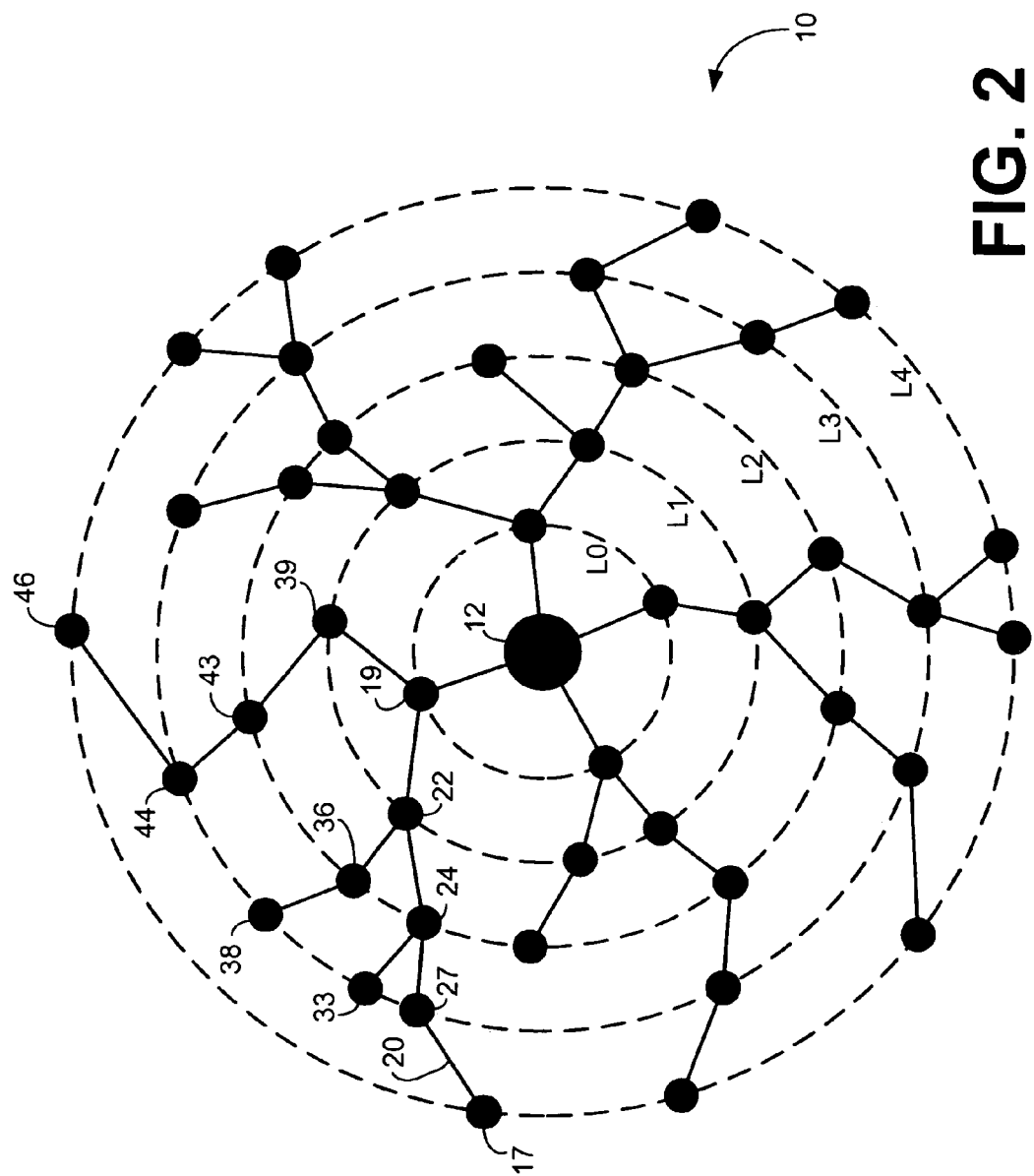
FIG. 2 is a diagram of the mesh network of FIG. 1 with the bidirectional links for all the radio nodes shown.

FIG. 2 is a diagram of the mesh network 10 of FIG. 1 with the bidirectional links for all the radio nodes in this mesh network shown. As stated above, each of the radio nodes on the higher logical layer attempt to minimize their distance to access node 12 by searching for repeaters more closely logically positioned to access node 12. In focusing on radio node 19, it serves as a repeater for eleven other radio nodes in this nonlimiting example. Although communication link 20 has already been described above, radio node 33 on layer 3 communicates with radio node 24, which uses radio node 22 on layer 1 as a repeater for communicating with radio node 19. Likewise, radio node 38 on layer 3 communicates with radio node 36 on layer 2, which itself communicates with radio node 22. And, as discussed above, radio node 22 communicates with radio node 19, as described above.

Radio node 19 supports an additional bidirectional link branched out through radio nodes 39 on layer 1, 43 on layer 2, and 44 on layer 3 to radio node 46 on layer 4. Consequently, access node 12 may maintain bidirectional links with a theoretically unlimited number of radio nodes logically grouped around access node 12, provided that a sufficient number of the radio nodes may serve as repeaters for nodes positioned on logically lower numbered layers.

Out of all the radio nodes that share the same specific layer number, some may be more suitable than others for serving as a repeater for radio nodes on logically higher numbered layers. So as to differentiate between radio nodes based on the degree of ability to serve as a repeater, each radio node in mesh network 10 computes or determines its power number. In at least one nonlimiting example, radio nodes with higher power number values are generally deemed to be more suitable as repeaters than radio nodes with lower power number values. As discussed in more detail below, each radio node computes its own power number and periodically informs its neighboring radio nodes of its determined power number. The process of doing this may be worth given some consideration:

As a nonlimiting example, the power number may be in the range of 0 to 1 and may be computed based on the following formula:

$$PN = X_{battery} * X_{buffer}$$

In this nonlimiting example, $X_{battery}$ is a coefficient in the range of 0 to 1 that corresponds to the battery status. A value of 0 corresponds to a discharged battery, while a value of 1 corresponds to a fully charged battery or constant power source.

Likewise, $X_{buffer}$ is a coefficient in the range of 0 to 1 corresponding to the message buffer status, or available memory. A value of 0 corresponds to the notion that the buffer memory of the radio node is full. In this situation, the radio node cannot serve as a repeater due to the fact that its memory is full. In serving as a repeater, instances may occur such that the radio node stores messages received from nodes on higher layers, thereby utilizing a certain amount of memory in the radio node. Thus, if the radio node has no available memory for storing such messages, it cannot act as a repeater. Likewise, a value of 1 for the buffer status means that the message buffer memory is empty and can store messages in transit.

Each of the radio nodes of mesh network 10 has limited visibility and communicability in the network topology. Stated another way, each radio node is logically aware of its nearest neighbors, to which it may establish and maintain direct communication. As described above, when a radio node prepares to send a message to access node 12, the radio node makes an instantaneous decision about which of its nearest neighbors to use as a repeater for relaying a message to the access node 12. Likewise, the radio node that is selected as a repeater in turn follows the same process and chooses one of its nearest neighbors on a lower numbered layer for serving as a repeater to reach access node 12. In this way, a bidirectional communication link, such as link 20 in FIG. 1, is established between nodes that may not directly communicate with access node 12. Nevertheless, each of the radio nodes in mesh network 10 makes its own determination as to which radio node to use as a repeater, which may periodically change based on power numbers and other criteria, as described below.

Figure 3:
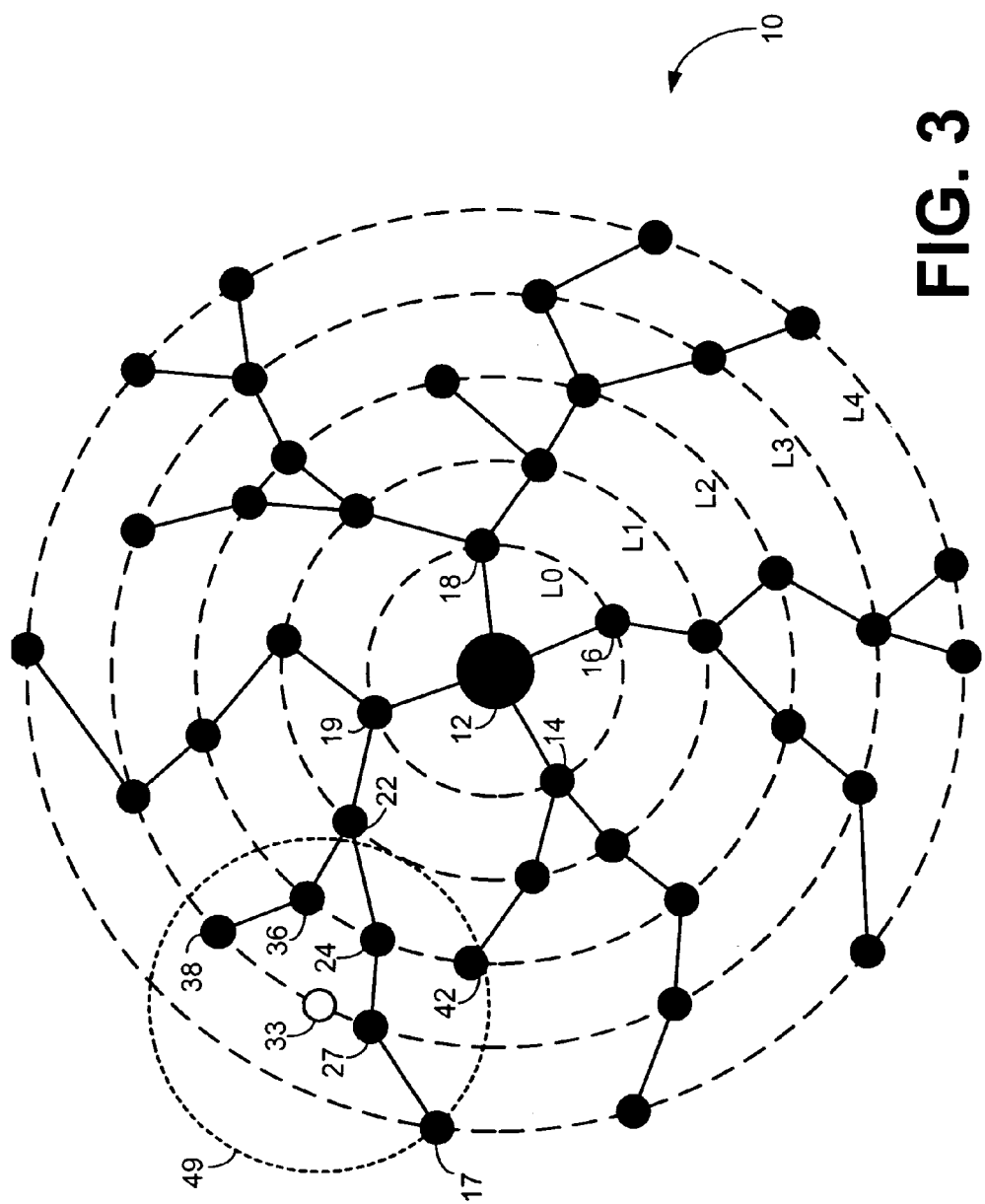
FIG. 3 is a diagram of the mesh network of FIG. 1 with a single radio node on layer 3 highlighted to illustrate the repeater selection process implemented by radio nodes.

FIG. 3 is a diagram of the mesh network 10 of FIG. 1 with radio node 33 on layer 3 highlighted to illustrate the repeater selection process, as described above. Radio node 33 has a communication range 49, which means that radio nodes 17, 27, 38, 42, 24, and 36 are within range of direct bidirectional communications from radio node 33. Likewise, in this nonlimiting example, each of radio nodes 17, 27, 38, 42, 24, and 36 have a transmission range that overlaps and includes radio node 33. (The transmission ranges of these respective nodes are not shown for clarity, but in this nonlimiting example, their transmission ranges each encompass radio node 33.) In this nonlimiting example of mesh network 10 in FIG. 3, radio node 33 must determine which of radio nodes 17, 27, 38, 42, 24 or 36 to select as a repeater for communicating with access node 12.

Figure 4:
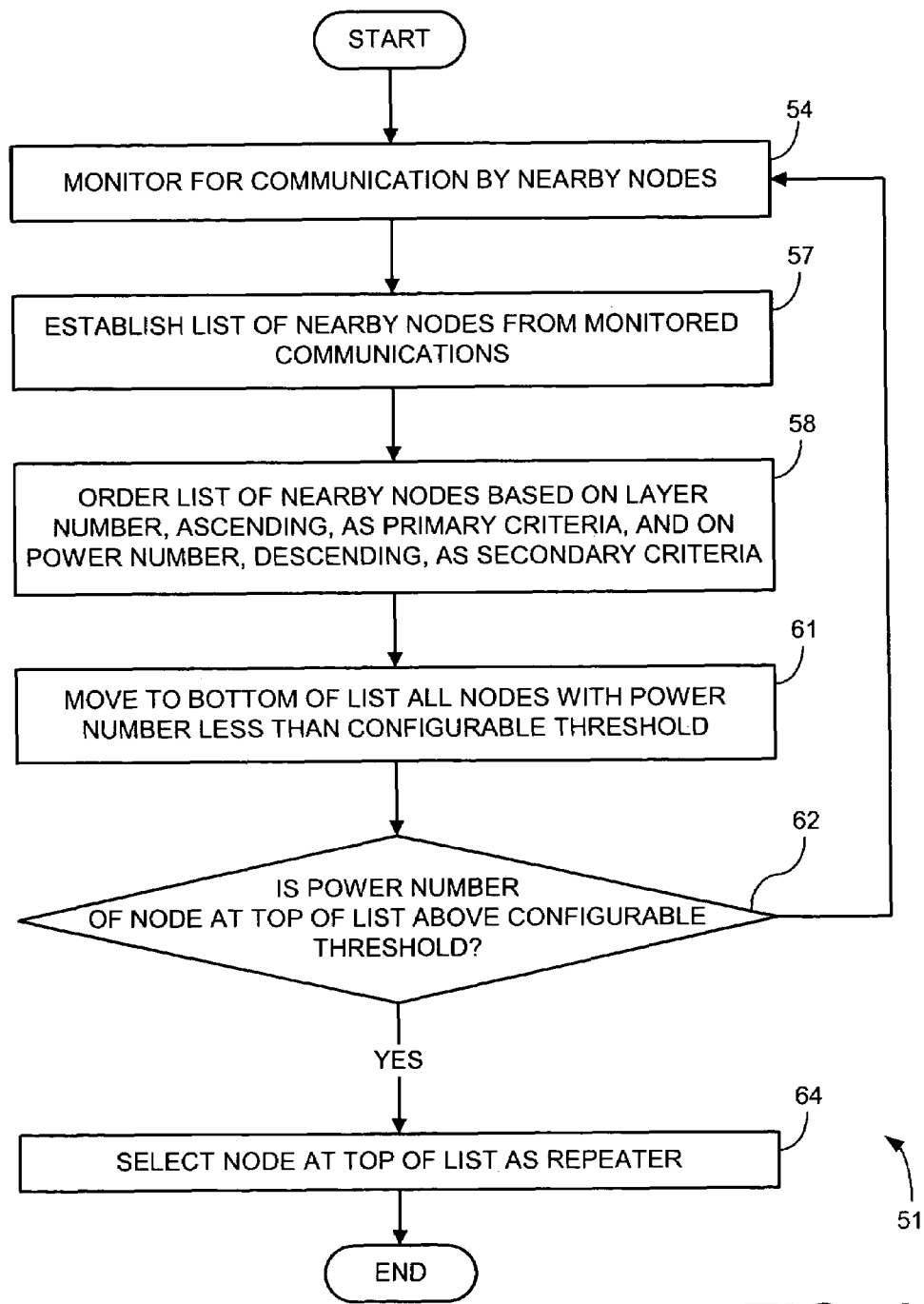
FIG. 4 is a flow chart diagram of the process which the radio nodes of FIG. 1 implement for selecting a repeater for communicating with access node of FIG. 1.

FIG. 4 is a flow chart diagram 51 of the process in which radio node 33 (or any other radio node in mesh network 10) executes for selecting a repeater for communicating with access node 12. Upon commencing the process for selecting a repeater, radio node 33 monitors for communications by other nearby radio nodes, as shown in step 54. This monitoring process is performed periodically by the radio nodes, and in at least one nonlimiting example, this monitoring process is executed constantly. Radio node 33 engages in this listening mode because other nearby radio nodes may include both the layer number and power number in regular RF transmissions. While continuously receiving these transmissions, radio node 33 establishes a list of nearby nodes from the monitored communications, as shown in step 57. In at least one nonlimiting example, this list is continuously adjusted, but the list may also be adjusted according to any predetermined period, as one of ordinary skill in the art would also know.

Once the list is established, radio node 33 engages in step 58, which is the ordering of the list of the nearby radio nodes based on the layer number, ascending, as primary criteria, and on the power number, descending, a secondary criteria. The following table represents the ordered list of nearby nodes for radio node 33 (FIG. 3) based on its surrounding neighbors within communication range 49 (FIG. 3).

TABLE 1

Ordered List of Nearby Nodes for Radio Node 33 of FIG. 3

| Node Number | Layer Number | Power Number |
|---|---|---|
| 24 | 2 | 1 |
| 36 | 2 | 0.75 |
| 27 | 3 | 1 |
| 38 | 3 | 0.5 |
| 17 | 4 | 0.9 |
| 42 | 2 | 0.2 |

Radio node 33 advances to step 61, which directs radio node 33 to move to the bottom of its list all radio nodes with a power number that is less than a configurable threshold. As a nonlimiting example, if radio node 33 is configured such that any power number less than 0.5 is deemed to be unusable as a repeater, radio node 42 would be moved to the bottom of the list according to step 61, even though it is on a lower numbered layer 2. As discussed above, radio node 42 may have a power number of 0.2 due to its low battery or memory status. Thus, because of this low number, radio node 42 is undesirable as a repeater, and it is accordingly eliminated from further consideration as a repeater.

After reorganizing the list of radio nodes, radio node 33 thereafter determines whether the power number of the radio node at the top of the list is above the configurable threshold. If not—meaning that the power number is below 0.5 in this nonlimiting example—radio node 33 resorts back to step 54 and again commences monitoring for communications by nearby nodes for the purpose of detecting another radio node that may serve as a repeater.

In this nonlimiting example and as shown in Table 1, radio node 24 does indeed have a power number that is greater than 0.5. Table 1 also shows that radio node 24 has a layer number of 2. Radio node 36 in this nonlimiting example also has a layer number of 2; however, its power number is 0.75, which is lower than the power number of radio node 24. Accordingly, radio node 36 is rated below radio node 24 as a potential repeater for radio node 33.

Radio node 27 has a layer number of 3, which is higher than the layer number of both radio nodes 24 and 36. Accordingly, even though radio node 27 has a higher power number than radio node 36, its higher-valued layer number causes it to be placed third in the list of potential repeater nodes.

Likewise, radio node 38 is placed fourth in the list of potential repeater nodes behind radio nodes 24, 36, and 27 due to the fact that it is on layer 3 and has a power number of 0.5, which is at the minimum threshold. Finally, radio node 17 is placed last on the list of nodes that may be used as a repeater (irrespective of disqualified node 42) due to the fact that radio node 17 resides on logical layer 4.

After radio node 33 has executed steps 54, 57, 58, and 61 of FIG. 4, radio node 33 selects the node at the top of the list, which in this nonlimiting example is radio node 24. Radio node 33 selects radio node 24 as a repeater for communicating with access node 12, thereby forming a bidirectional link as shown in FIG. 2. Because each radio node of mesh network 10 executes this series of steps independently, the repeating routes are constructed and modified dynamically and continuously by the mesh network 10 itself based on the actual conditions in the field.

Access node 12, according to this nonlimiting example, has no input in programming or controlling the repeating routes as shown in mesh network 10 of FIG. 2. In time, radio nodes of mesh network 10 may change position in the network (such as, as a nonlimiting example, if a radio node is positioned on a floating device such as a buoy that moves in and out of communication ranges of other various radio nodes), thereby resulting in the periodic re-execution of these series of steps for selecting new repeating routes to access node 12. Accordingly, the list of nodes as shown in Table 1 may periodically change, thereby ensuring that each individual radio node has a list of potential candidates for serving as a repeater for communicating to access node 12.

As an additional nonlimiting example, radio node 33 of FIG. 3 may be a node that is newly introduced to the mesh network 10, or a radio node that has reappeared due to a recent power failure, etc. In this case, radio node 33 is configured to implement a registration process with access node 12 after initial power or after having lost communication with all known neighbors to transfer from an unregistered state into a registered state.

Figure 5A:
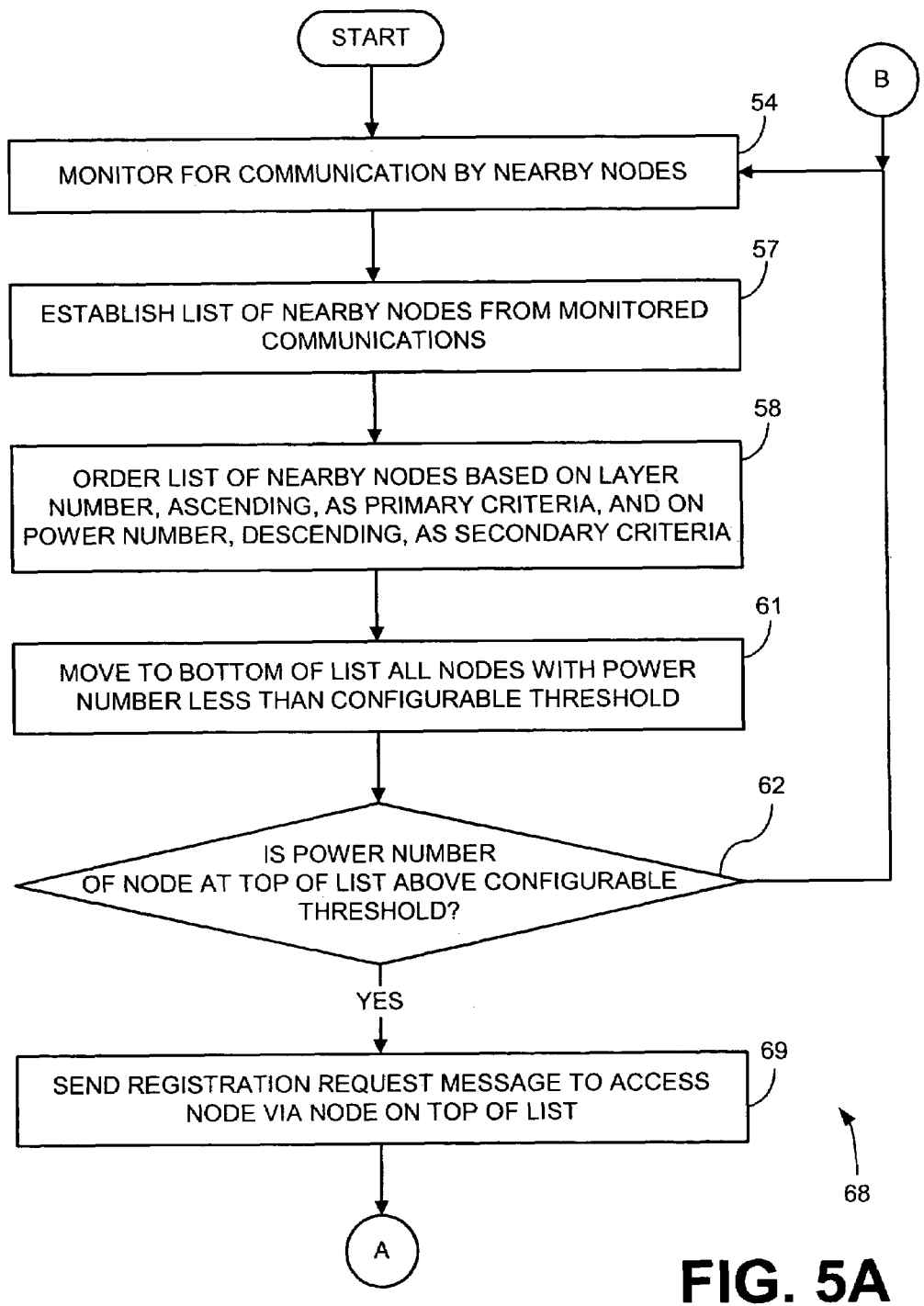
FIGS. 5A and 5B comprise a flow chart diagram of the registration process implemented by a radio node of FIG. 1.

FIG. 5A is a flow chart diagram 68 of the registration process of a radio node to the access node of FIG. 1. As indicated above, when a node is initially powered up or has previously lost communication with all known neighboring radio nodes, the radio node proceeds to re-register with the mesh network 10.

Steps 54, 57, 58, and 61 in FIG. 5A are executed, as described above in regard to FIG. 4. After determining that the power number of the node at the top of the list is above the configurable threshold of step 62, which in this nonlimiting example is radio node 24 for radio node 33 in FIG. 3, radio node 33 thereafter sends a registration request message to the access node 12, as shown in step 69 of FIG. 5A. More specifically, radio node 33 wirelessly communicates a registration request message to radio node 24, which serves as a repeater for communicating the message to radio nodes 22 and 19, and then on to access node 12, as shown in steps 72 and 74 of FIG. 5B. As radio nodes 24, 22, and 19 implement steps 72 and 74 of FIG. 5B, each of these nodes inserts its own address into the data section of the message communicated from radio node 33, as shown in step 74.

Eventually, the message reaches access node 12 carrying in its data section the repeating route through which the message traveled. More specifically, the registration request message would include in its data section the sequence of repeaters 24, 22, and 19. Access node 12 thereafter saves this route and uses it in reverse for communicating future messages to radio node 33.

Figure 5B:
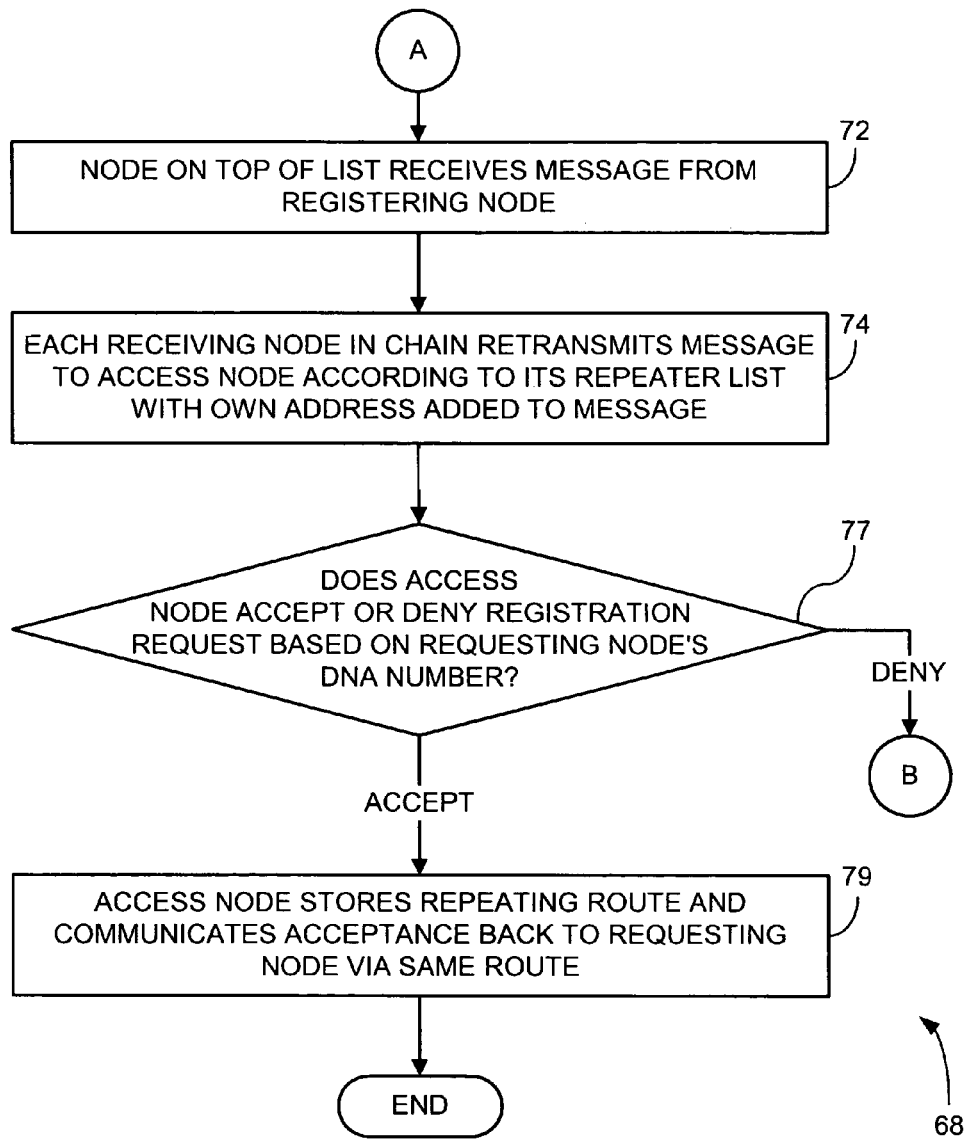

In FIG. 5B, step 77 provides that access node 12 may choose to accept or deny the registration request message from radio node 33 based on the DNA number of requesting node 33. The DNA number is an identifier that indicates device specific information such as version, hardware capabilities, application ID, owner ID, etc., as nonlimiting examples.

Access node 12 may be configured to accept or reject classes of DNA numbers. As a nonlimiting example, access node 12 may be configured to support several different types of applications on the same infrastructure, or may be likewise configured to restrict usage to one or a few select applications. As a further nonlimiting example, access node 12 may be configured to accept DNA numbers corresponding to electrical meter applications, gas meter applications, water meter applications, or some further configuration thereof.

Access node 12 determines whether to accept or reject the registration request from radio node 33 based on its DNA number in step 77. If access node 12 denies the registration request from radio node 33, radio node 33 resorts to step 54 (FIG. 5A) and again begins monitoring for communications by nearby nodes in an attempt to find another access node for establishing communication. However, if access node 12 accepts the registration request from radio node 33, access node 12 stores the repeating route (via radio nodes 24, 22, and 19), as shown in step 79. Furthermore, access node 12 communicates acceptance back to radio node 33 via the same route, but in reverse. More specifically, the communicated acceptance travels from access node 12, to radio node 19, to radio node 22, to radio node 24, and finally to destination radio node 33.

As a nonlimiting example, instead of a newly installed radio node initially resorting to a monitoring mode to detect communications from nearby neighboring radio nodes, the radio node may instead begin transmitting an initialization signal to its neighboring radio nodes. The neighboring radio nodes within the transmission area of the newly installed radio node may be configured to thereafter respond to the initialization signal with a reply transmission. Each reply transmission may contain power number data as well as time synchronization information. The newly installed radio node may thereafter select a repeater radio node, as described above and register with the access node in the mesh network.

Additionally, the registration of radio node 33, as shown in FIG. 3 and as described in FIGS. 5A and 5B, may occur in a mesh network 10 where other radio nodes are already registered and mesh network 10 is an operating network. However, circumstances may arise when mesh network 10 is composed of 100% unregistered radio nodes around access node 12. In this situation, none of the radio nodes transmit a registration request because the radio nodes do not proceed beyond step 54 of FIG. 5A due to the fact that each radio node remains in an endless loop of monitoring for communications from other radio nodes. Stated another way, each of the radio nodes listen for one another to initiate a communication, but because none of the radio nodes are registered, no communication is initiated from any radio node. Accordingly, FIGS. 6A-6E are diagrams of a portion of the mesh network of FIG. 1 configured such that all radio nodes are at least initially in an unregistered state.

Figure 6B:
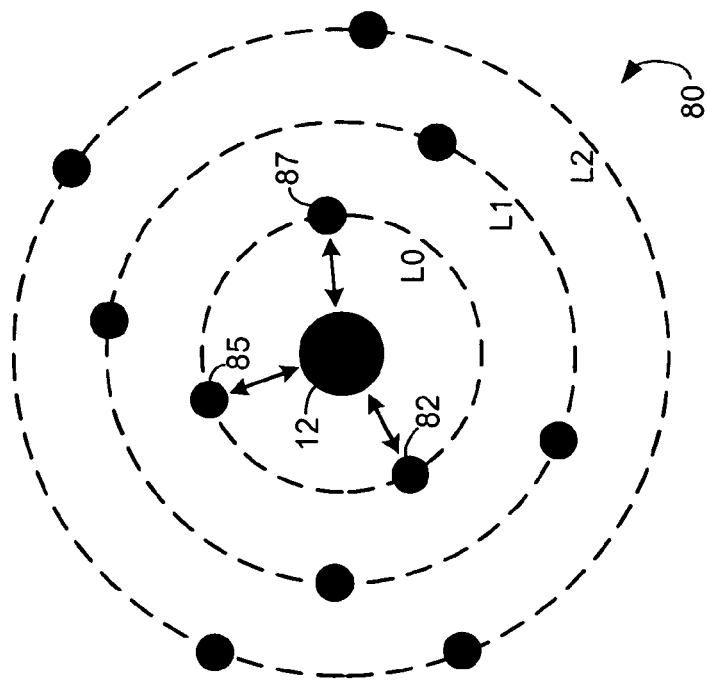
FIGS. 6A-6E are diagrams of a mesh network like the network of FIG. 1 with all radio nodes in an unregistered state.
Figure 6A:
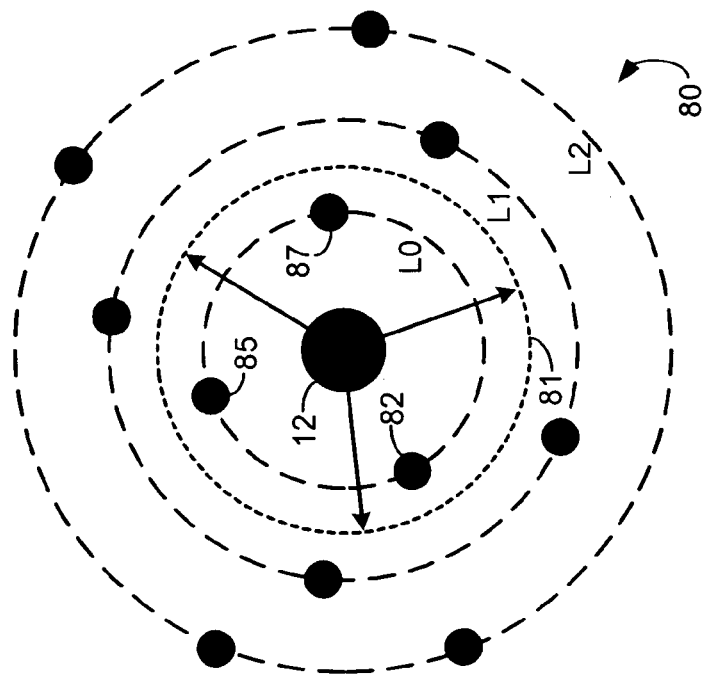

To initiate the registration process of the radio nodes in mesh network 80 of FIG. 6A, access node 12 broadcasts a synchronization message which extends to broadcast range 81. Broadcast range 81 encompasses radio nodes 82, 85, and 87 on level 0. Radio nodes 82, 85, and 87 receive the synchronization message from access node 12. Because each of these radio nodes determine that they may directly communicate with the access node 12, they logically orient themselves on layer 0 in mesh network 80. The synchronization message broadcast by access node 12 is broadcast periodically by access node 12, as access node 12 may be unaware of any power outage causing all radio nodes to resort to an unregistered state.

Nevertheless, upon broadcasting the synchronization message, radio nodes 82, 85, and 87 register with access node 12, as shown in mesh network 80 in FIG. 6B. More specifically, these radio nodes logically orient themselves on layer 0 and establish a direct bidirectional link with access node 12.

Figure 6D:
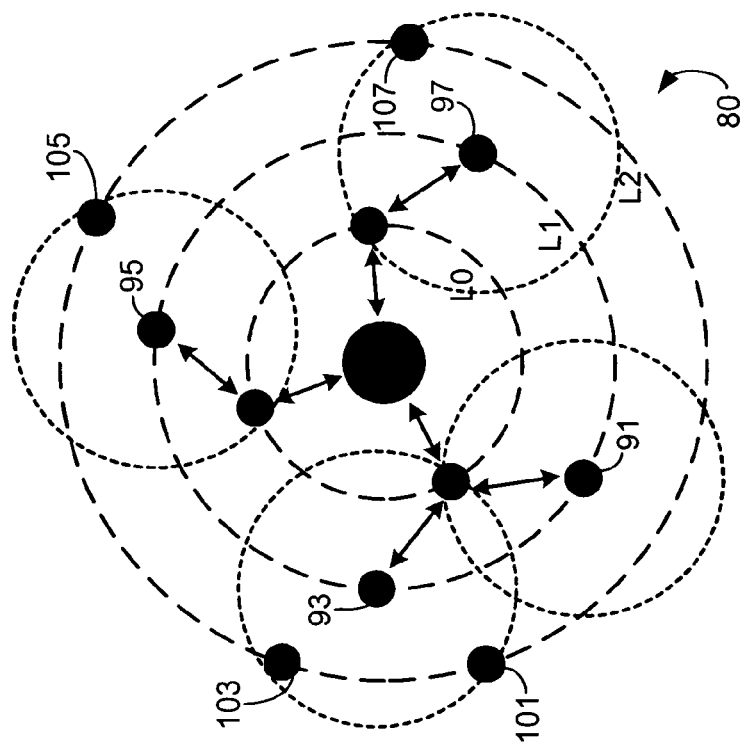
Figure 6C:
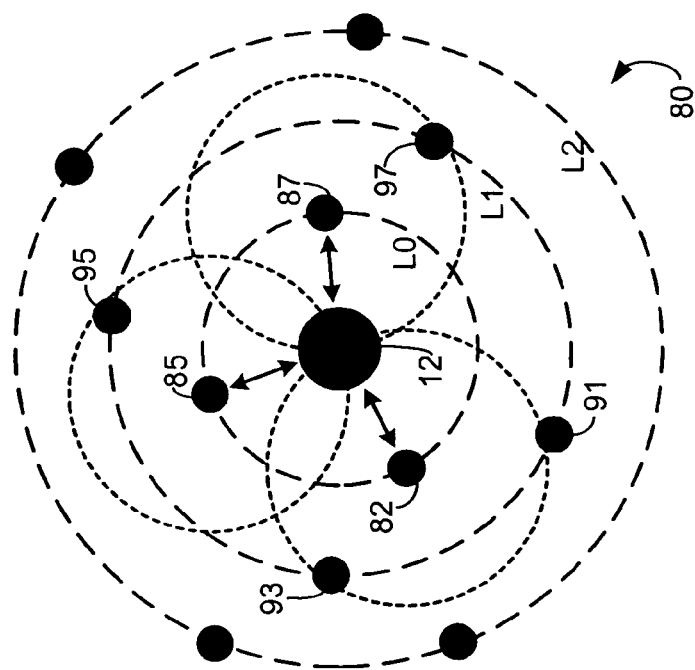

Once these nodes 82, 85, and 87 are registered, their respective transmissions with access node 12 are detected by radio nodes 91, 93, 95, and 97 that are within the communication range of radio nodes 82, 85, and 87, as shown in FIG. 6C. These radio nodes 91, 93, 95, and 97 are positioned beyond the broadcast range of access node 12, but not beyond the communication range of the nodes of layer 0. Accordingly, each of radio nodes 91, 93, 95, and 97 establish themselves as nodes on logical layer 1 and rely on the nodes 82, 85, and 87 on layer 0 for communicating with access node 12, as shown in FIG. 6D.

As furthermore shown in FIG. 6D, the wireless communications ranges of radio nodes 91, 93, 95, and 97 on logical layer 1 are detected by radio nodes 101, 103, 105, and 107. As likewise discussed above, these radio nodes 101, 103, 105, and 107 logically orient themselves on layer 2 and utilize the radio nodes on layer 1 and layer 0 as repeaters for communicating with access node 12. Thus, the mesh network 80 of FIG. 6E is reestablished as all nodes in the mesh network are registered and bidirectional links are established with access node 12.

Each registration request message received by access node 12 contains the repeating route. For example, in FIG. 6E, a registration request message sent by radio node 105 contains in the data section of the message the sequence pertaining to radio node 95 and radio node 85. Access node 12 stores this route in a table and uses it when access node 12 sends a message back to radio node 105.

Figure 6E:
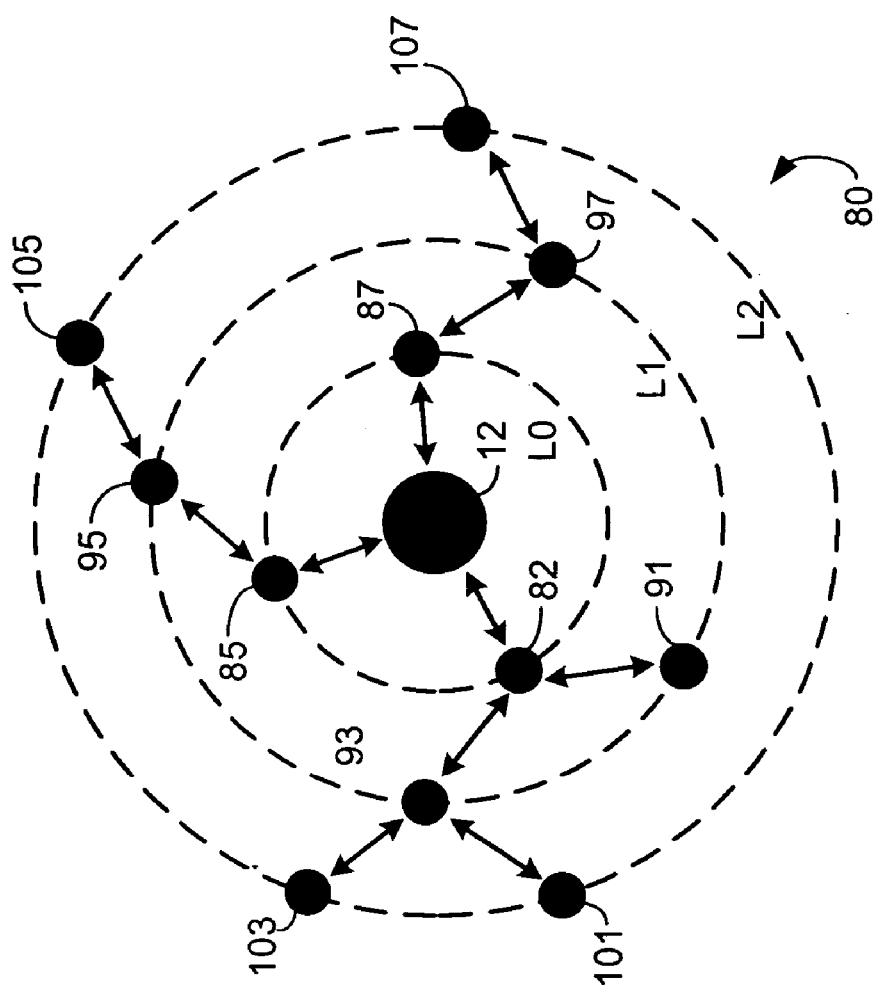

Each time radio node 105 chooses to use a different repeater to send a message (assuming as a nonlimiting example that a node appears on level 1 as an alternate to node 95, which is not shown in FIG. 6E), the new repeater inserts its address into the message, thereby informing access node 12 of the change. This rule is repeated by all repeaters on the path between radio node 105 and access node 12 so that all changes in the route are captured in the message, thereby informing access node 12 of the latest repeated route to radio node 105. Thus, as a nonlimiting example, if radio node 105 had an alternate route through radio node 97 on layer 1, radio node 105 could use the route through radio node 97 or through radio node 95 for communicating with access node 12, depending upon whatever route was available and most desired at the time. However, if one of the routes failed or was no longer available to radio node 105, radio node 105 would select the other, that is, assuming that the other was still available at that time. Either way, access node 12 is informed of the latest route and thereafter updates its routing information in regard to radio node 105 for future communications back to radio node 105. Previous routes are not deleted, but are simply used as alternatives in the case that the preferred route or latest route does not ultimately work.

As an alternate embodiment for informing the access node 12 of a position change in the radio nodes of the mesh network 10, specific route change messages may be issued by the radio nodes each time a communication route is altered. As a nonlimiting example, radio node 105 could be configured to notify the access node 12 that it had selected a new radio node, such as radio node 97, as its repeater for communicating with the access node 12. Upon receipt of this message, the access node 12 could be configured to save this new routing information in similar manner, as described above.

The discussion to this point has involved a single access node with logically positioned radio nodes around the single access node, such as access node 12 in FIG. 1 of mesh network 10. However, a situation may exist where multiple access nodes exist in geographical proximity to each other such that one or more radio nodes may dynamically align from one access node to another, depending upon the relative logical layered positions that the radio nodes can achieve respective to the access nodes available. As a nonlimiting example, the access nodes from a plurality of different networks may be in proximity to each other where the radio nodes may be able to communicate with multiple access nodes, even though the applications associated with each access node may be different. Nevertheless, even in this situation, as long as the access nodes do not deny registration to the various radio nodes dispersed in the mesh network 10, then the various radio nodes may register in each of the networks at different times.

Figure 7:
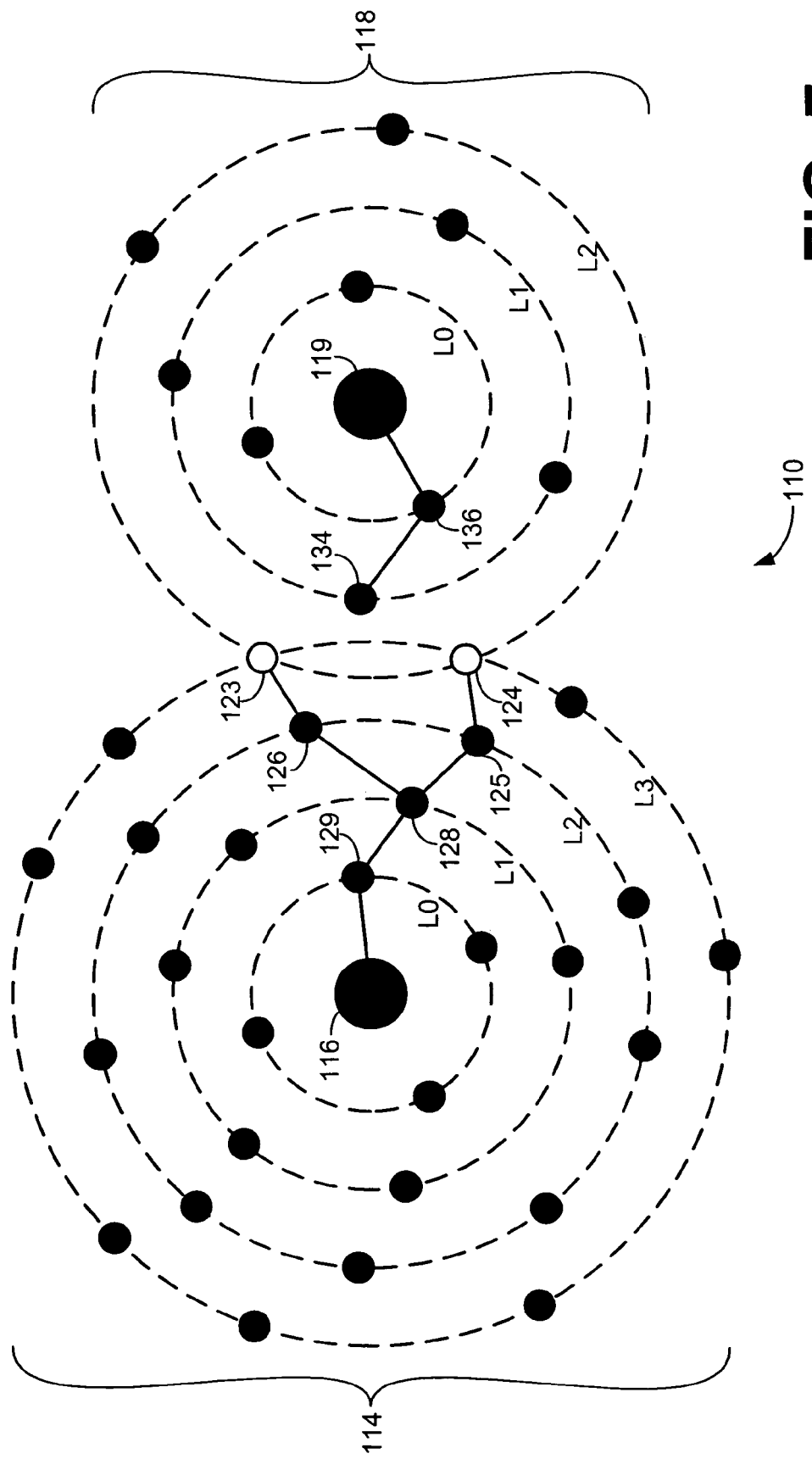
FIG. 7 is a diagram of two mesh networks (both similar to the mesh network of FIG. 1) wherein select radio nodes may register with either mesh network.

FIG. 7 is a diagram of two mesh networks wherein the access nodes enable select radio nodes to register in either of the mesh networks shown therein. In FIG. 7, the meshed networks 110 are comprised of a first network 114 around access node 116 and a second mesh network 118 based upon access node 119. In this nonlimiting example, mesh network 114 includes a plurality of radio nodes dispersed over layers L0, L1, L2, and L3, whereas mesh network 118 comprises a plurality of radio nodes dispersed over three levels including layers L0, L1, and L2. As a nonlimiting example, radio nodes 123 and 124 are initially a part of mesh network 114 and reside on level L3. More specifically, radio node 123 communicates with access node 116 via a repeated route that includes radio nodes 126, 128, and 129. Similarly, radio node 124 communicates bidirectionally with access node 116 in mesh network 114 via the repeated route that includes radio nodes 125, 128 and 129.

In this nonlimiting example, a situation may arise where mesh network 118 is introduced around access node 119 such that radio nodes 134 and 136 create a communication link to access node 119. Upon introduction, the two mesh networks 114, 118 begin to balance their respective loads.

Figure 8:
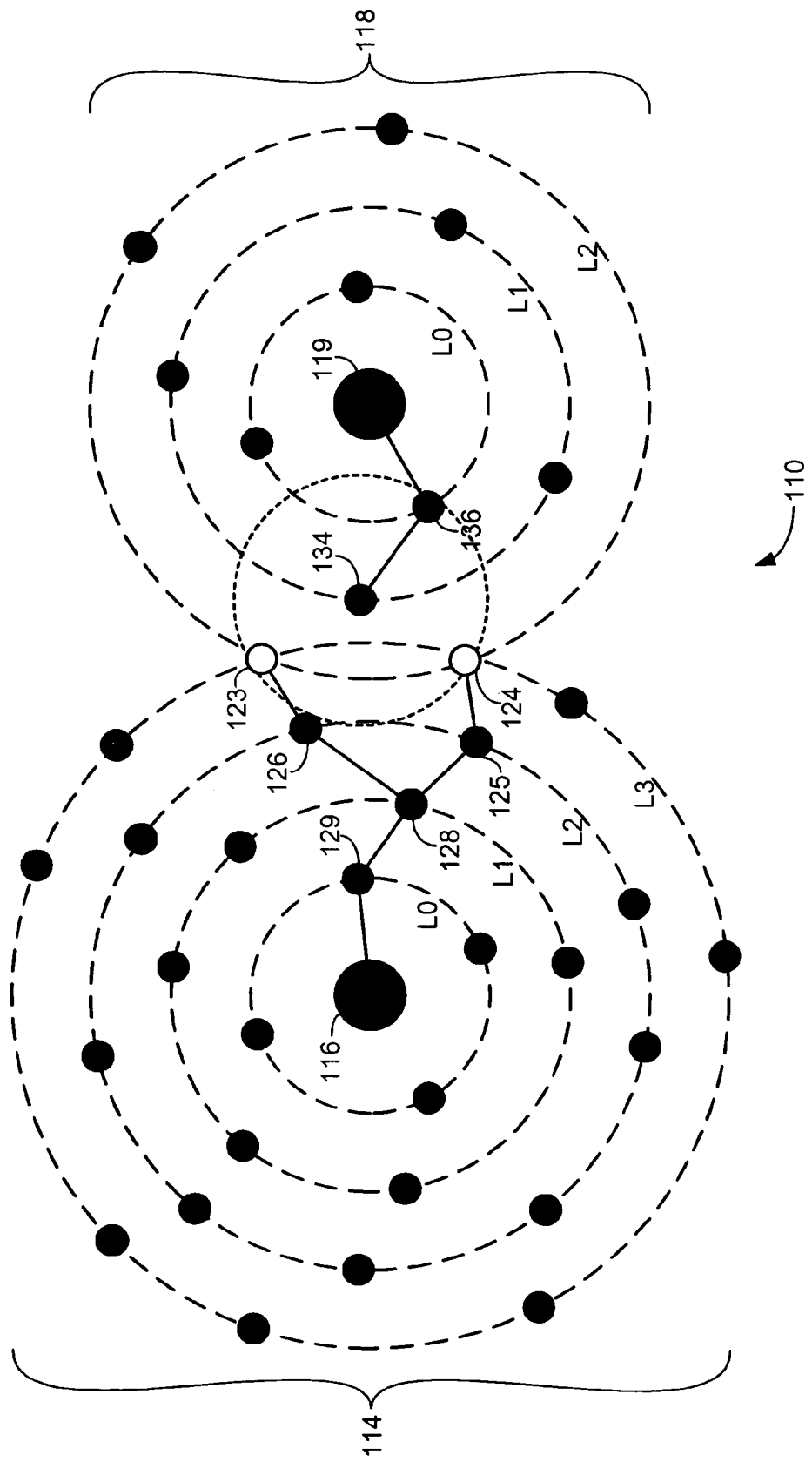
FIG. 8 is a diagram of the mesh networks of FIG. 7 showing the dynamic reconfiguration of the networks.

FIG. 8 is a diagram of the pair of mesh networks of FIG. 7 showing the dynamic reconfiguration of the network. In this instance, transmissions from radio node 134, which may comprise communications with radio node 136, are also monitored and detected by radio nodes 123 and 124 of mesh network 114. As discussed above, radio nodes periodically adjust their repeater table, as shown in Table 1 above, for determining the shortest path to an access node.

As a nonlimiting example, radio node 123 is established as a layer 3 node that communicates with radio node 126, which is a layer 2 node for ultimately communicating with access node 116. Likewise, radio node 124 is a layer 3 node that maintains bidirectional communication with radio node 125, which is a layer 2 node.

Upon detecting communications from radio node 134 of mesh network 118, it is determined that radio node 134 is a layer 1 node and therefore closer to an access node than either of radio nodes 125 or 126. Assuming in this nonlimiting example that the power number of radio node 134 is above the minimum threshold of acceptable power numbers, as discussed above, radio node 134 will be placed at a higher position in the repeater table over radio nodes 125 and 126 for radio nodes 124 and 123, respectively. Even if the power number of radio node 134 is less than the power number of radio nodes 125 and 126, radio nodes 123 and 124 will still prefer radio node 134 as a repeater due to its closer positioning to an access node. Nevertheless, before moving to a different access node network, a registration process will be executed, as described above.

Figure 9:
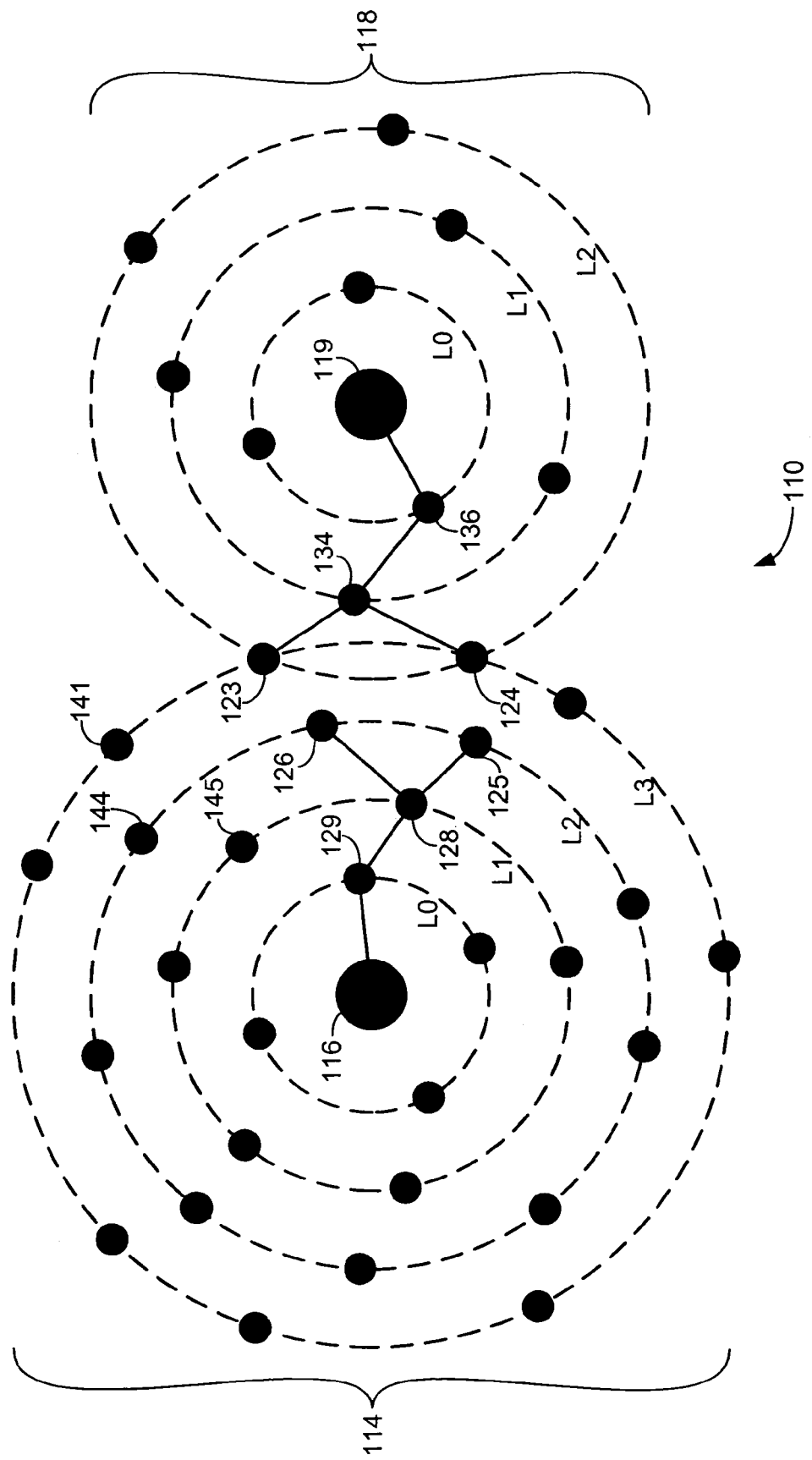
FIG. 9 is a diagram of the mesh networks of FIG. 7 with the radio nodes dynamically adjusted and load-balanced.

FIG. 9 is a diagram of the mesh networks 110 of FIG. 7, but with the radio nodes dynamically adjusted and load balanced. In recognizing radio node 134 as a preferred repeater over repeater 126, radio node 123 establishes a bidirectional link with radio node 134, which is linked to radio node 136 for communicating to access node 119. Similarly, radio node 124 establishes a bidirectional link with radio node 134 instead of radio node 125 of mesh network 114. In each case, radio nodes 123 and 124 now communicate with access node 119 of mesh network 118 instead of access node 116 of mesh network 114. In making this dynamic adjustment, radio nodes 123 and 124 improve their respective layer number from layer 3 to layer 2 in each instance.

As a further nonlimiting example, radio node 141, which may communicate with access node 116 via a repeater route comprising radio nodes 144, 145, and 129, may similarly dynamically adjust its repeater route from access node 116 to access node 119 via radio node 123. As a nonlimiting example, if the power number of radio node 123 is higher than radio node 144, radio node 141 may adjust its repeater route so as to establish a bidirectional link with radio node 123 for communicating with access node 119. In this case, radio node 141 remains a layer 3 node, as it would be one layer higher than radio node 123—a layer 2 node. Thus, this instance is one wherein the dynamic adjustment of repeater routes is based on power number, which may be in regard to battery status and/or memory availability in the respective radio nodes 123 and 144. As the power number of each of these nodes adjusts over time, radio node 141 may oscillate back and forth between the repeated routes in mesh networks 114 of the aforementioned repeater routes in mesh networks 114 and 118.

As indicated above, mesh networks 114 and 118 may actually be networked for unrelated applications; however, radio nodes 123 and 124 may select communication routes through either mesh network 114 or 118 due to the similarity of the mesh protocol of each network if the access nodes accept their respective requests for registration. As a nonlimiting example, radio node 123 may be coupled to a power utility meter and may be configured for communicating electricity consumption to a centralized location. Likewise, mesh network 114 may also comprise radio nodes coupled to electric meters for communicating application related data for electricity consumption.

Mesh network 118 may comprise radio nodes coupled to gas meters (as a nonlimiting example) for communicating gas consumption to access node 119 that is forwarded to either the same or another centralized location as access node 116. Nevertheless, even though these networks comprise radio nodes that relay information for different applications, the similar construction and communicability of the networks enables radio nodes 123 and 124 to communicate over either mesh network 114 or 118 irrespective of the specific application of the individual radio nodes that comprise the network. It should also be understood that each of mesh networks 114 and 118 periodically rearrange themselves automatically as radio nodes are added and deleted from the networks and as the power numbers of the respective nodes change.

This rearrangement or realignment of radio nodes to a different mesh network may also occur if an access node fails. As a nonlimiting example, the radio nodes of mesh network 114 may realign to mesh network 118 if access node 116 fails. In this nonlimiting example, the radio nodes of mesh network 118 will migrate towards other nearby mesh networks, such as mesh network 118, as described above. This self-healing provides network redundancy in the event of an access node failure.

Returning to FIG. 2, from a timing perspective, communication is organized among the various radio nodes and access node 12 in periodic cycles, each cycle having an outbound and an inbound period. The outbound period is used to indicate the flow of messages sent from the access node 12 to the various radio nodes, such as radio node 17 on layer 4. The inbound period is used to indicate the flow of messages from the radio nodes, such as from radio node 17 to access node 12. Each layer of the mesh network 10 is configured with its own communication time period and sleep period during both the inbound and outbound periods of the cycle.

Figure 10:
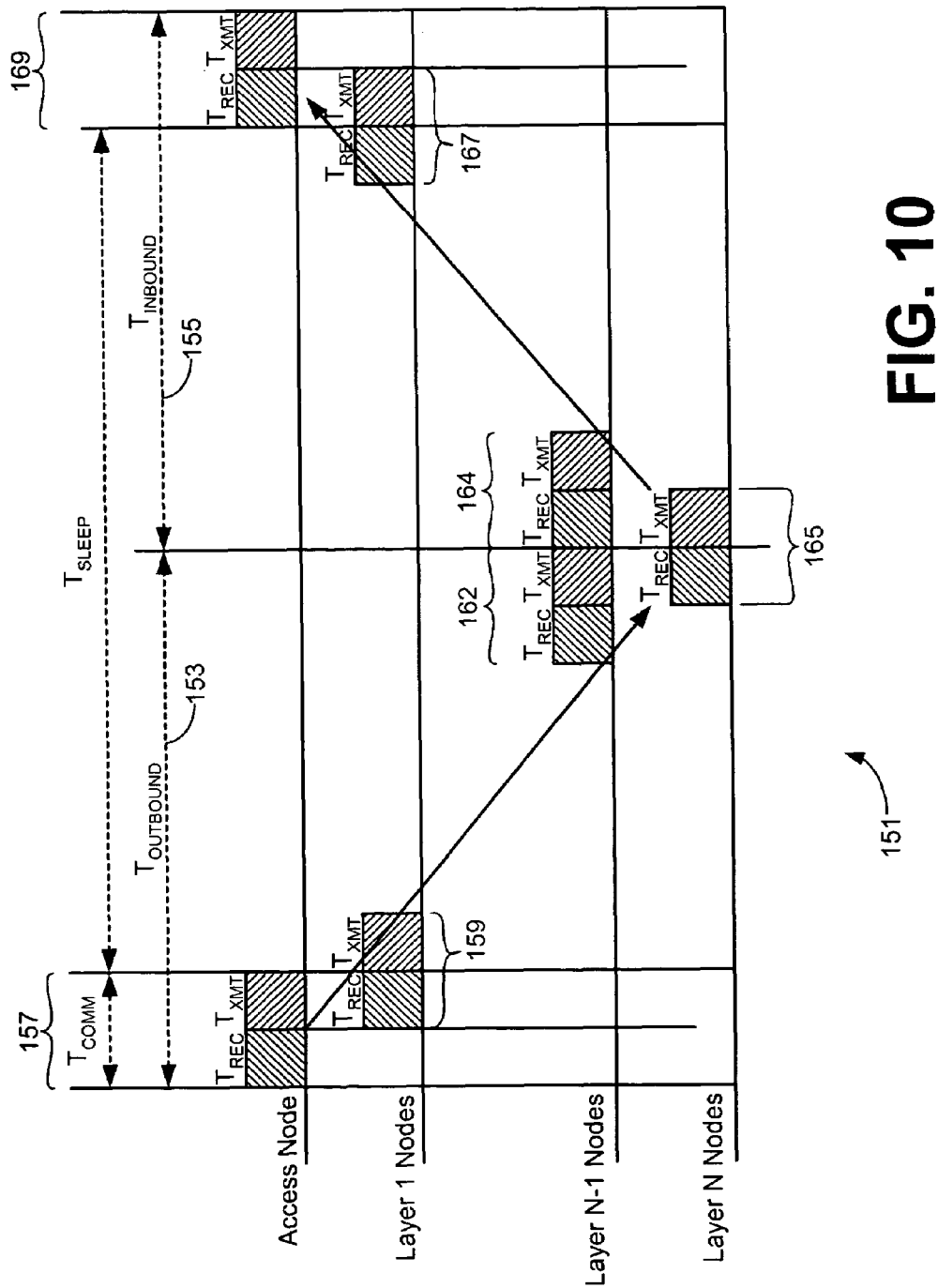
FIG. 10 is a chart representing the distribution of time slots for communication between the access node and various radio nodes of the mesh network of FIG. 1.

FIG. 10 is a chart 151 representing the distribution of time slots for communication between the access node 12 and various radio nodes of mesh network 10. As discussed above, the communication cycle is divided into an outbound period 153 and an inbound period 155. Within the outbound and inbound times 153, 155, respectively, the access node and each layer of radio nodes have a designated communication time. Within communication time 157 for access node 12, a first portion is dedicated to receiving communications from layer 0 nodes (shown in FIG. 10 as $T_{REC}$) and a second portion is designated for transmitting outgoing messages to layer 0 nodes (shown in FIG. 10 as $T_{XMT}$). During the transmit portion of communication time 157, all layer 0 nodes are in a receiving portion of their respective communication time 159. In that way, access node 12 transmits outgoing messages to layer 0 nodes, which thereafter transmits messages to layer 1 nodes during the latter portion of communication transmit time 159 to layer 1 nodes, and so forth. For nodes on layer N−1 where N is the highest layer of the mesh network (N would be layer 4 in the mesh network 10 of FIG. 2), the communication time 162 for nodes on this layer would include a first receiving portion to receive messages from the next lower layer of nodes and then a transmit portion to transmit messages to the nodes on the most outer layer of the mesh network.

During the transmit portion $T_{XMT}$ of the communication time 162 for the second to last layer of nodes, nodes on the outer layer are in the receive portion of their communication time 165. Thus, at the end of the receiving time of communication time 165, all outgoing messages have been propagated throughout the mesh network 10 of FIG. 2.

During the latter portion of communication time 165, the most outer layer nodes begin inbound transmissions back toward access node 12 in reverse fashion, as described above. Communication time 164 for layer N−1 nodes includes a receiving portion $T_{REC}$ that coincides with the transmit portion $T_{XMT}$ of communication time 165 for layer N nodes. Thus, the outer layers continue to transmit toward the access node 12 such that nodes on layer 0 have a communication time 167 that includes a receive and transmit portion, wherein the transmit portion overlaps with communication time 169 for access node 12.

Each radio node has a duty cycle that may be represented as $T_{COMM}/T_{COMM}+T_{SLEEP}$. By decreasing the duty cycle, the average power consumption is decreased, making it possible to extend the life of radio nodes that are battery powered. To decrease the duty cycle, the communication time $T_{COMM}$ can be decreased and the sleep time $T_{SLEEP}$ can be increased, independently from one another. The amount that the communication time can be decreased is related to the minimum accepted capability of the radio node to repeat the message that is received. Stated another way, each radio node has a minimum predetermined amount of transmission time so as to be able to transmit the message in a manner to ensure the highest level of probability that the message is received by the intended node. Messages of increased length utilize a greater amount communication time $T_{COMM}$. Moreover, the speed of communication, or, for example, the modem bandwidth, may also determine communication time of the various radio nodes and the mesh network 10.

Nevertheless, the sleep time $T_{SLEEP}$ of the various radio nodes and access node 12 can be increased without restriction. In so doing, the average power consumption can be reduced, thereby extending the battery life of any battery-powered radio node. However, by increasing the sleep time $T_{SLEEP}$ of the radio nodes and access node of mesh network 10, the side effect is realized in the decreased overall speed of the network. Accordingly, for each practical application for mesh network 10, a reasonable compromise is generally achieved between the battery life and the acceptable network speed. As discussed above the communication time is comprised of two components, the transmit and receive times. During the transmit time, the radio node's main function is to transmit messages. Likewise, during the receive time, the radio node's main function is to receive messages, either from the access node or from one of the other radio nodes.

As a nonlimiting example, each transmission between radio nodes and the access node may include an ACK and a NACK response. Even during the transmit period, a radio node may receive an ACK/NACK message as a response to transmissions. Likewise, radio nodes, even in the receive communication period, may also transmit the ACK/NACK messages as a response to receive messages.

More specifically, each transmission from a radio node to another radio node or an access node is followed by an ACK/NACK type message communicated by the receiving party to the transmitting party. This link ACK/NACK message represents the recipient's agreement or disagreement to assume responsibility for further retransmitting and/or processing the message. This ACK/NACK message may include the power number, as described above. Thus, this implementation is at least one nonlimiting example for periodically communicating power number information to the neighboring radio nodes as opposed to regularly broadcasting this information between radio nodes, which could consume bandwidth. In either instance, neighboring radio nodes continuously monitor communication traffic, so receipt of ACK/NACK messages enables a radio node to adjust its list of nearby radio nodes, as discussed above.

So that the various $T_{XMT}$ and $T_{REC}$ periods between radio nodes on adjacent levels are synchronized, at least one non-limiting example includes in the link ACK/NACK message date and time data that is synchronized with the access node. More specifically, ACK/NACK messages sent from a lower logical layered radio node to a higher logical layered radio node may include a date and time value of the lower layer radio node, which is itself synchronized to either another lower logical layered radio node or to the access node. Thus, the date and time value of the access node gets propagated throughout the network regularly using regular RF traffic, particularly the link ACK/NACK messages transmitted on the outbound path in this nonlimiting example. Therefore, all radio nodes in the network have a date and time value synchronized with the access node.

As discussed above and shown in FIG. 10, during the outbound transmission period, a radio node is configured to communicate with radio nodes on the higher ordered layer. Similarly, during the inbound transmission period 155, a radio node communicates with radio nodes on the lower order layer. Thus, communications flow from the access node to the radio nodes on the outermost layer, and then back to the access node.

As another nonlimiting example, the ratio of transmission time to receive time may be adjusted so as to allocate more or less bandwidth for inbound traffic as compared to outbound traffic. Thus, as a nonlimiting example, an application performing data acquisition may have a transmission to receive ratio of less than 1, while an application directed to device control may have a transmission to receive ratio greater than 1. Likewise, an equally balanced network in terms of the inbound and outbound traffic may be configured such that the transmission to receive ratio is exactly 1, which is shown in FIG. 10.

In order to minimize RF traffic and reduce collisions between the various radio nodes of the mesh network, the radio nodes may be configured to consolidate the messages for both inbound and outbound traffic. In the case of inbound traffic, a radio node will group together messages from the higher level layer radio nodes during a receive period of its communication time, as shown in FIG. 10, into one consolidated message. This message is translated to a lower layer repeating node during the transmit period of that node.

Figure 11:
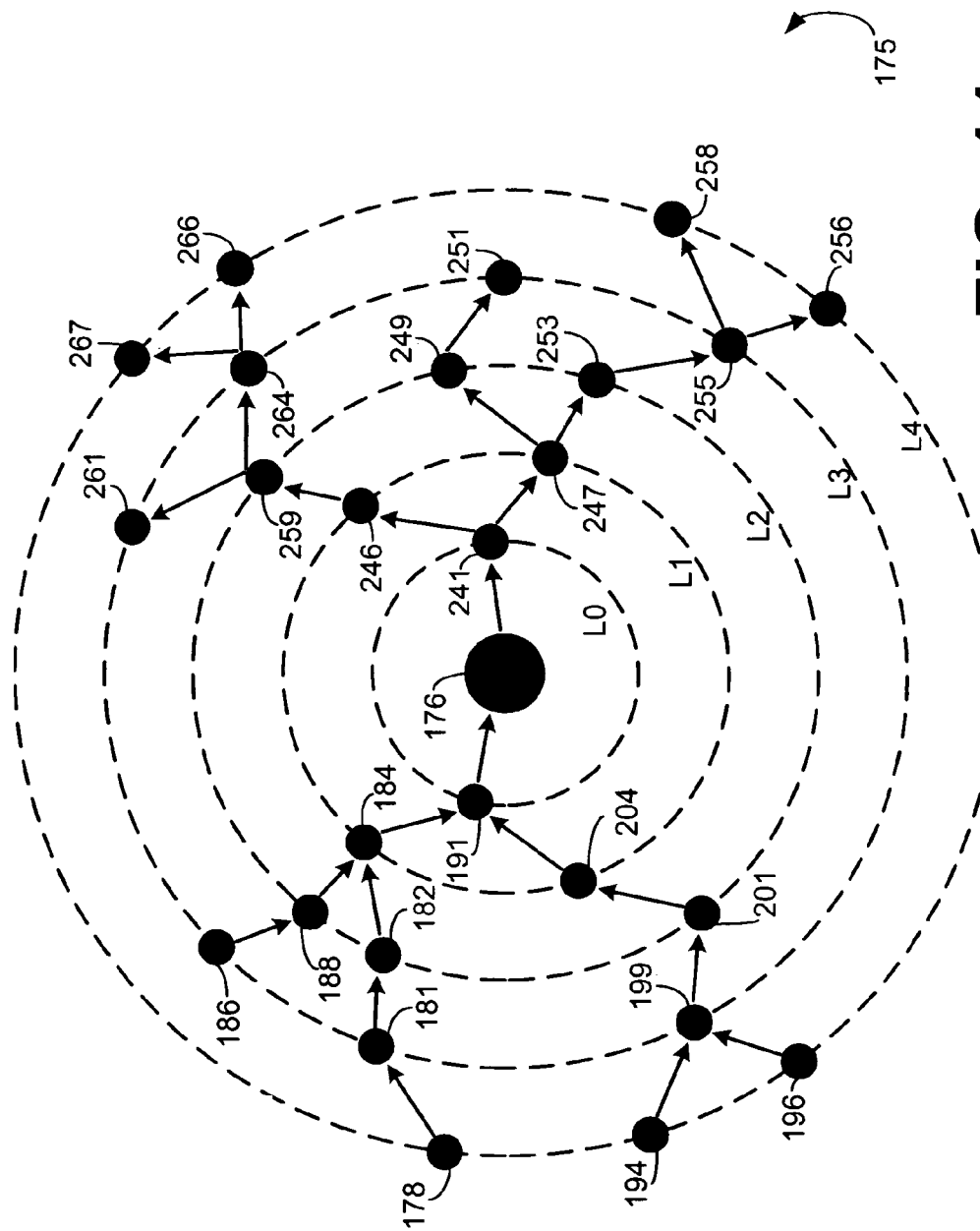
FIG. 11 is a diagram of a mesh network similar to the mesh network of FIG. 1 illustrating message consolidation.

FIG. 11 is a diagram of a mesh network 175 depicting consolidated inbound and outbound messages. Access node 176 communicates with various radio nodes over layer 0 through layer 4.

As messages are communicated from nodes on the outer layers 4 and 3 to the access node 176 across the inner layers 2, 1, and 0, the messages are consolidated by the various nodes in route to access node 176. Thus, for a message communicated from radio node 178 to access node 176, the message is communicated to radio nodes 181, 182, and 184. However, if at the same time radio node 186 is communicating an inbound message as well, it is communicated to radio node 188 and then to radio node 184. At this juncture, radio node 184 may consolidate the message contents into one single message that is thereafter communicated to radio node 191.

At the same time in this nonlimiting example, radio nodes 194 and 196 may communicate inbound messages to radio node 199, which consolidates the two separately received messages into a single message that is communicated to and repeated by radio nodes 201 and 204 until reaching radio node 191. Radio node 191 consolidates the message from radio node 204 and the message from radio node 184 into one single message that is thereafter communicated to access node 176. By consolidating messages, each radio node sends fewer messages and is able to fully communicate its payload within its designated transmit time because the length of the consolidated message is not significantly longer than a single message. Each message has a header section and a data section. By consolidating n messages, the resulting message will have one header section and n data sections. Also the ACK/NACK corresponding response is sent once in the case of a consolidated message.

Figure 12:
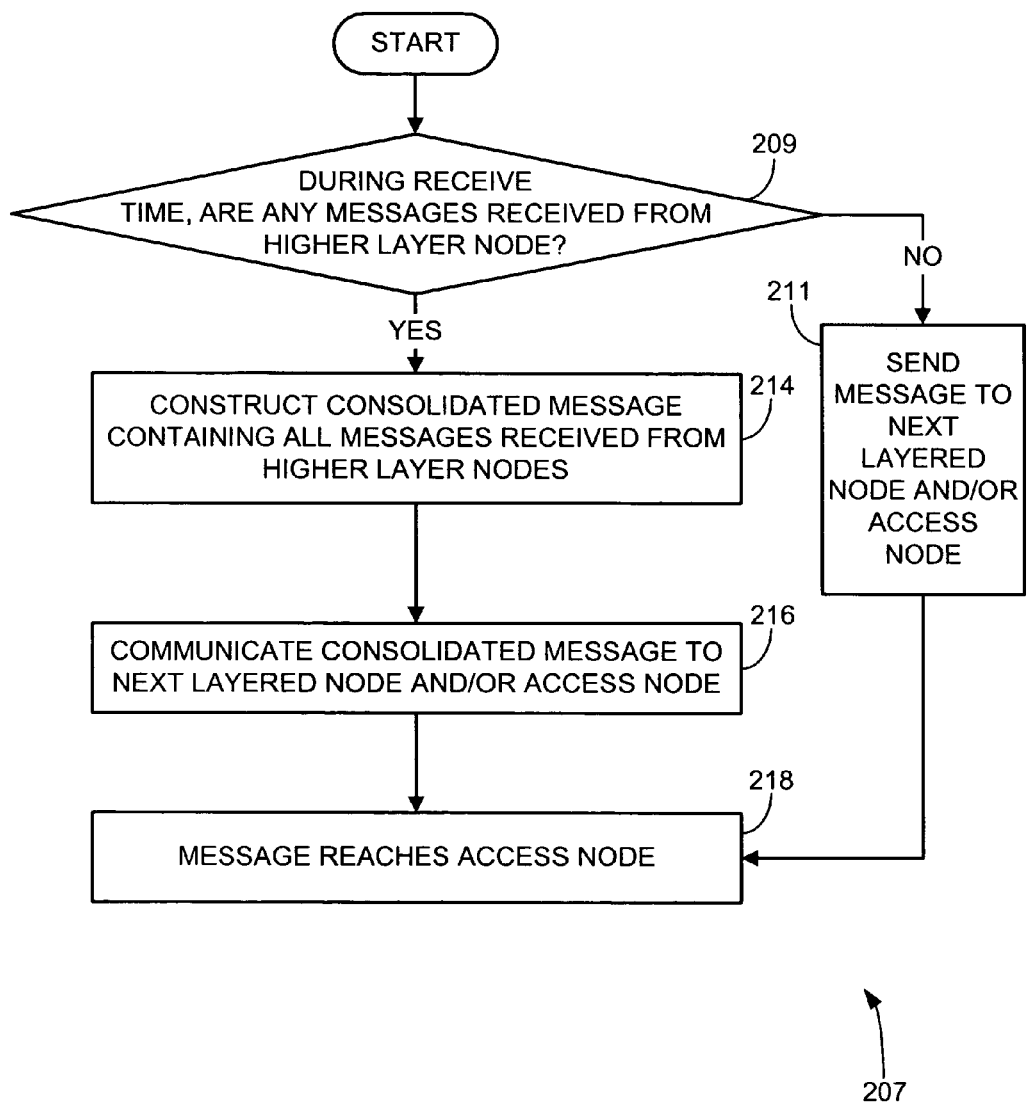
FIG. 12 is a flow chart diagram of the message consolidation process, as shown in FIG. 11.

FIG. 12 is a flow chart diagram of the message consolidation process as shown in FIG. 11. In step 209, each radio node determines during its receive time whether any messages were received from a higher layer node. If not, the radio node performs step 211 and sends a message to the next lower layer node and/or to the access node, if indeed a message is to be sent. However, if a message is received by a particular radio node during its receive time, a consolidated message is constructed containing all of the received messages from the higher level nodes, as shown in step 214. Once the message is constructed, the radio node communicates that consolidated message to the next layered node and/or to the access node, as shown in step 216. Finally, in step 218, the consolidated message reaches the access node. Thus, if radio node 184 (FIG. 11) receives messages from radio nodes 188 and 182 (both of FIG. 11) during its receive time, radio node 184 consolidates those messages and then forwards the consolidated message to radio node 191, which itself may consolidate a message received from radio node 204 in its communication time to access node 176.

As a result of consolidating messages, the time for initializing communication between radio nodes one layer apart is significantly reduced due to the fact that the higher layer radio node is only transmitting a single packet preamble instead of a packet preamble for every message that it itself received. Because the initialization time is constant for messages sent between radio nodes regardless of the message size, a reduction of the number of messages sent resulting from message consolidation furthermore results in a reduction of the overall radio frequency traffic. Consequently, the likelihood of message collisions is significantly reduced.

Message consolidation may also be implemented for outbound traffic from access node 176 of mesh network 175 as well. In the case of outbound traffic, the access node 176 may group outbound messages together that share a common sequence in the initial portion of the respective routes.

Figure 13:
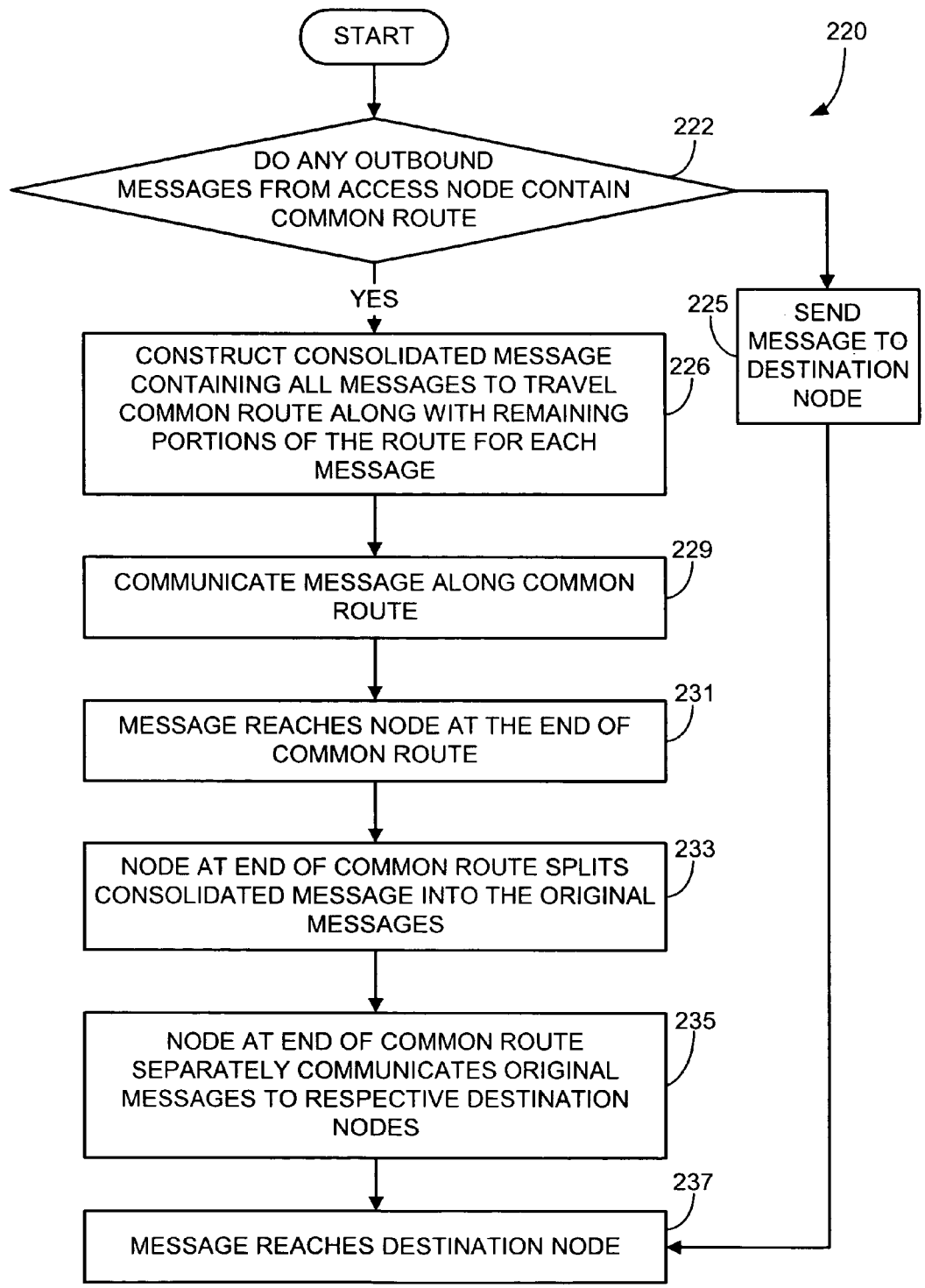
FIG. 13 is a diagram of the process for consolidating outbound messages, also shown in FIG. 11.

FIG. 13 is a diagram 220 of the process for consolidating outbound messages, also shown in FIG. 11. In step 222, the access node determines whether any outbound messages contain a common route. Thus, as a nonlimiting example, access node 176 may determine that it has a message for radio nodes 261, 266, and 258. In this nonlimiting example, the message route that is common between radio nodes 258, 261 and 266 includes radio node 241. The common route between radio node 261 and radio node 266 includes radio nodes 241, 246, and 259. If no common route is determined by access node 176, the access node will proceed to step 225 and send the unconsolidated message to its destination route. However, in this nonlimiting example, common routes are determined to exist between the destination nodes 258, 261, and 266.

Access node 176 performs step 226, which includes constructing a consolidated message containing all of the messages that travel the common route along with the remaining portions of the route for each message. In this nonlimiting example, access node 176 constructs a single message for radio nodes 258, 251 and 266 comprising the common routes described above and the individual messages and remaining routes for each of the individual radio nodes.

As a next step 229, access node 176 communicates the consolidated message along the common route, which, according to this nonlimiting example, includes just radio node 241. When the message reaches the end of the common route, as in step 231, the node at the end of the common route splits the consolidated message into its original messages, as in step 233. Thus, radio node 241 separates the message component for radio node 258 from the remaining consolidated message for radio nodes 261 and 266. So according to step 235, radio node 241 separately communicates the original message to radio node 258 and a still consolidated message along a common path to radio nodes 261 and 266.

In this nonlimiting example, the message communicated to radio nodes 261 and 266 remains consolidated because the route is common for each radio node 261 and 266. Thus, as required in step 229, a consolidated message is communicated along this common route and in step 231 reaches radio node 259. At this point, radio node 259 splits the consolidated message into two individual messages according to step 233, which is thereafter communicated to radio node 261 on layer 3 and then to radio node 264. Radio node 264 forwards the message to radio node 266 on layer 4, as required in steps 235 and 237 of FIG. 13. By consolidating outbound messages in this fashion, bottlenecks can be reduced or even eliminated, as opposed to if access node 176 were otherwise configured to communicate one message at a time to radio nodes having common routes.

The mesh network 10 may be configured such that the radio nodes may detect and intercept messages which identify that radio node as a repeater or as a final recipient. If a radio node is able to detect and receive a communication from a radio node two or more layers closer to the access node, and the message includes the intercepting radio node as a repeater or recipient, then the intercepting radio node may be permitted to immediately receive and execute the message rather than waiting to receive the message according to a previous route.

As a nonlimiting example, if in FIG. 11 access node 176 transmits an outbound message addressed for radio node 255 on logical layer 3, a previous route may proscribe that the message is communicated from the access node 176, to radio node 241, to radio node 247, to radio node 253, and then finally to destination radio node 253. However, if radio node 255 is able to detect and receive transmissions from radio node 247 on logical layer 3, radio node 255 will receive the communication from radio node 247 that is otherwise intended for radio node 253. Upon receiving the transmission from radio node 247, radio node 255 recognizes that it is the intended recipient for the communication. Thus, rather than waiting to receive the communication a second time from repeating radio node 253, radio node 255 instead proceeds to execute the subject of the communication. Thus, radio node 255 essentially elevates its logical position to logical layer 2.

In similar fashion, if radio node intercepts the communication from radio node 247 but instead recognizes that the intended recipient is, as another nonlimiting example, radio node 258 on logical layer 4, radio node 255 may still intercept the communication. In this instance, radio node 255 may intercept the communication and forward the message to the intended recipient rather than waiting to receive the transmission from radio node 253, which is according to a previous communication pathway. This process shortens the communication time of the transmission from the access node to the final destination. So by monitoring all communications in this manner, the radio nodes may improve the efficiency of the mesh network.

The radio nodes of mesh network 10 in FIG. 1 may be configured to recognize and report various alarm conditions, such as power outages, fire alarms, etc. When an alarm condition affects several radio nodes or devices coupled to radio nodes at once, they may each attempt to send an alarm message indicating the condition. Since an alarm condition may happen at or substantially close to the same time for each radio node, the radio nodes each attempt to send the alarm messages simultaneously. However, the mass communication of virtually identical alarm condition messages may create bottlenecks and message collisions between common radio nodes and the access node.

Figure 14A:
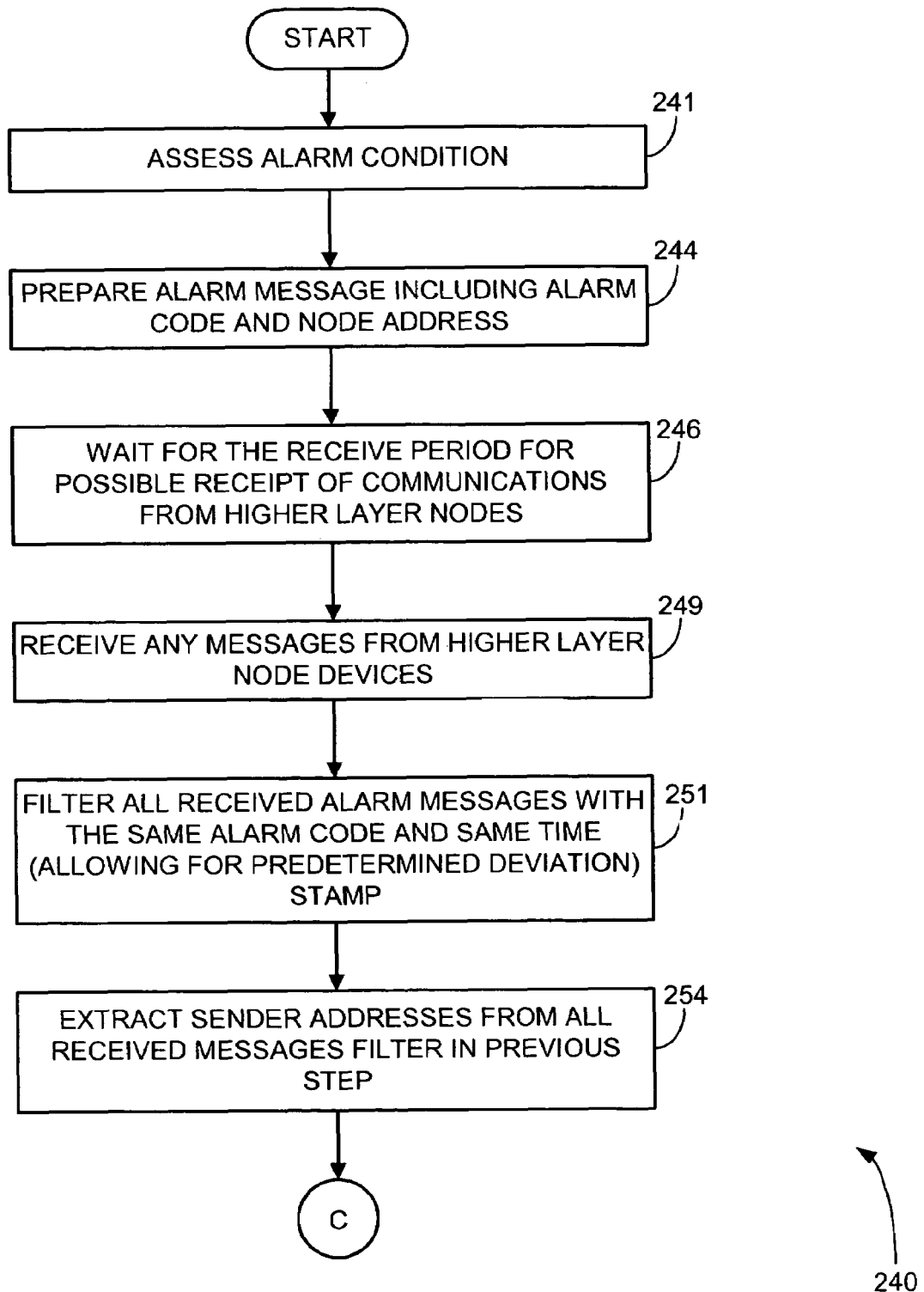
FIGS. 14A and 14B comprise a flowchart diagram of the steps radio nodes execute to communicate alarm conditions to the access node of FIG. 1.
Figure 14B:
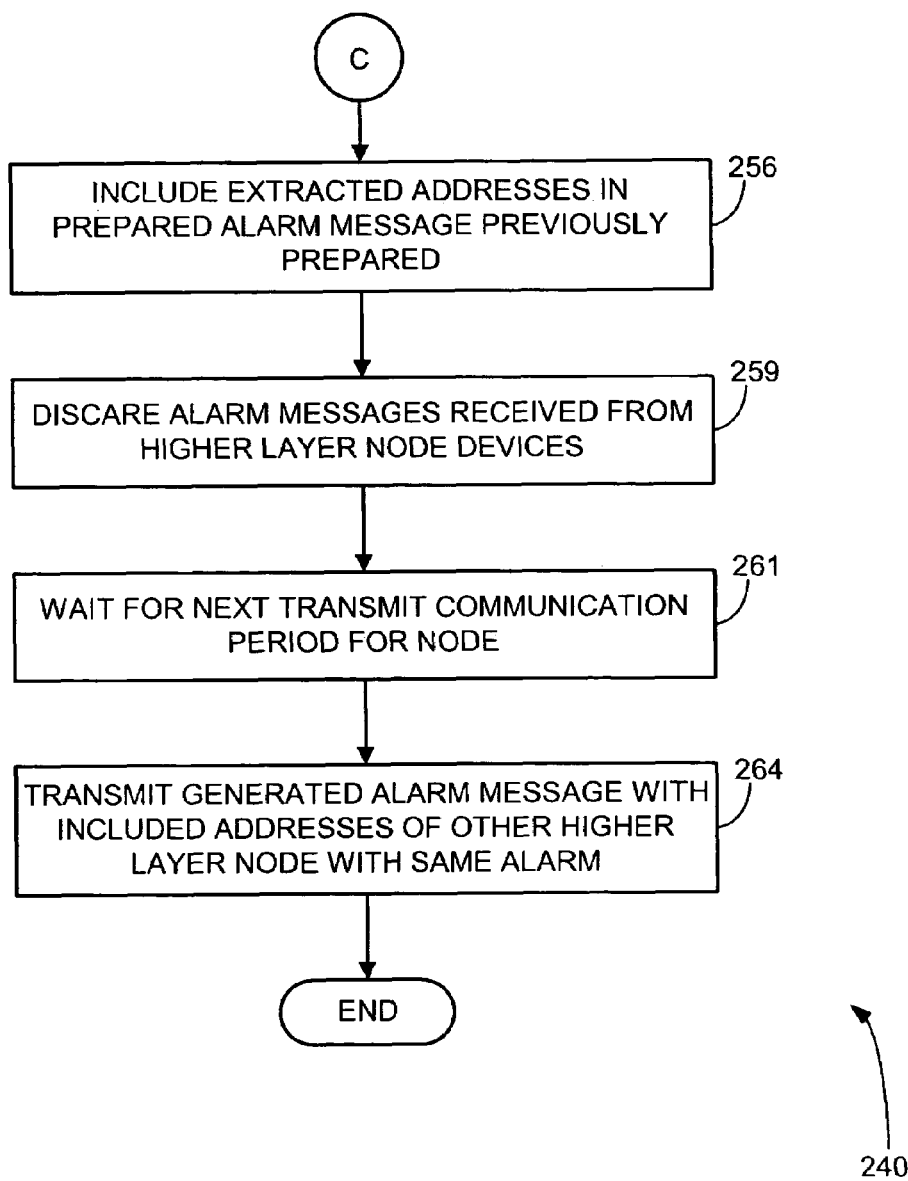

Accordingly, the large scale alarm process 240 in FIGS. 14A and 14B sets forth the steps in which the radio nodes execute for communicating alarm conditions to the access node 12 of FIG. 1. As set forth in process 240, each radio node of mesh network 10 of FIG. 1 implements the following set of steps before sending an alarm message to access node 12. In step 241, the radio node initially assesses the alarm condition, and in step 244, the radio node thereafter prepares an alarm message including the alarm code and the node address of the reporting radio node.

In step 246, the radio node waits for its next receive period $T_{REC}$ (FIG. 11) of its communication time $T_{COMM}$ for possible receipt of alarm messages from higher layered radio nodes that communicate with that particular radio node. In step 249, the radio node receives such alarm messages from higher layered nodes (in this nonlimiting example). Once all of the alarm messages are received, the radio node, in step 251, filters all of the received alarm messages with the same alarm code and same time stamp as the message prepared in step 241. It should be noted that a configurable time deviation is allowed to accommodate for differences in the clock synchronization between the various radio nodes of the mesh network 10 in FIG. 1. In step 254, the radio node extracts the sender addresses from all of the received messages filtered in step 251 and then includes the extracted addresses in the prepared alarm message that the radio node constructed in step 244.

Once all of the addresses have been included in the prepared alarm message of step 254, step 259 (FIG. 14B) prescribes that the received alarm messages from the higher layered node devices are discarded. The radio node thereafter waits for the next transmit communication period $T_{XMT}$ (FIG. 11) for that radio node, as prescribed in step 261, so that the radio node can thereafter transmit the consolidated alarm message in step 264 that has each of the addresses of the higher layered nodes having the identical alarm condition.

As a result of this process 240, order is introduced into the timing of the transmission so that not all of the transmissions happen at the same time. This consolidation eliminates collisions that may otherwise occur in the case of a large scale alarm, which may otherwise cause the radio nodes to attempt to communicate at the same time. In addition, the number of messages transmitted by the radio nodes to the access node 12 is significantly reduced by having each radio node consolidate all of the similar messages transmitted by the radio nodes on higher order layers into one single or just a few number of messages per alarm condition. Process 240 also results in increasing the overall percentage of radio nodes that are able to transmit information to access node 12 in the event of a large scale alarm.

Figure 15:
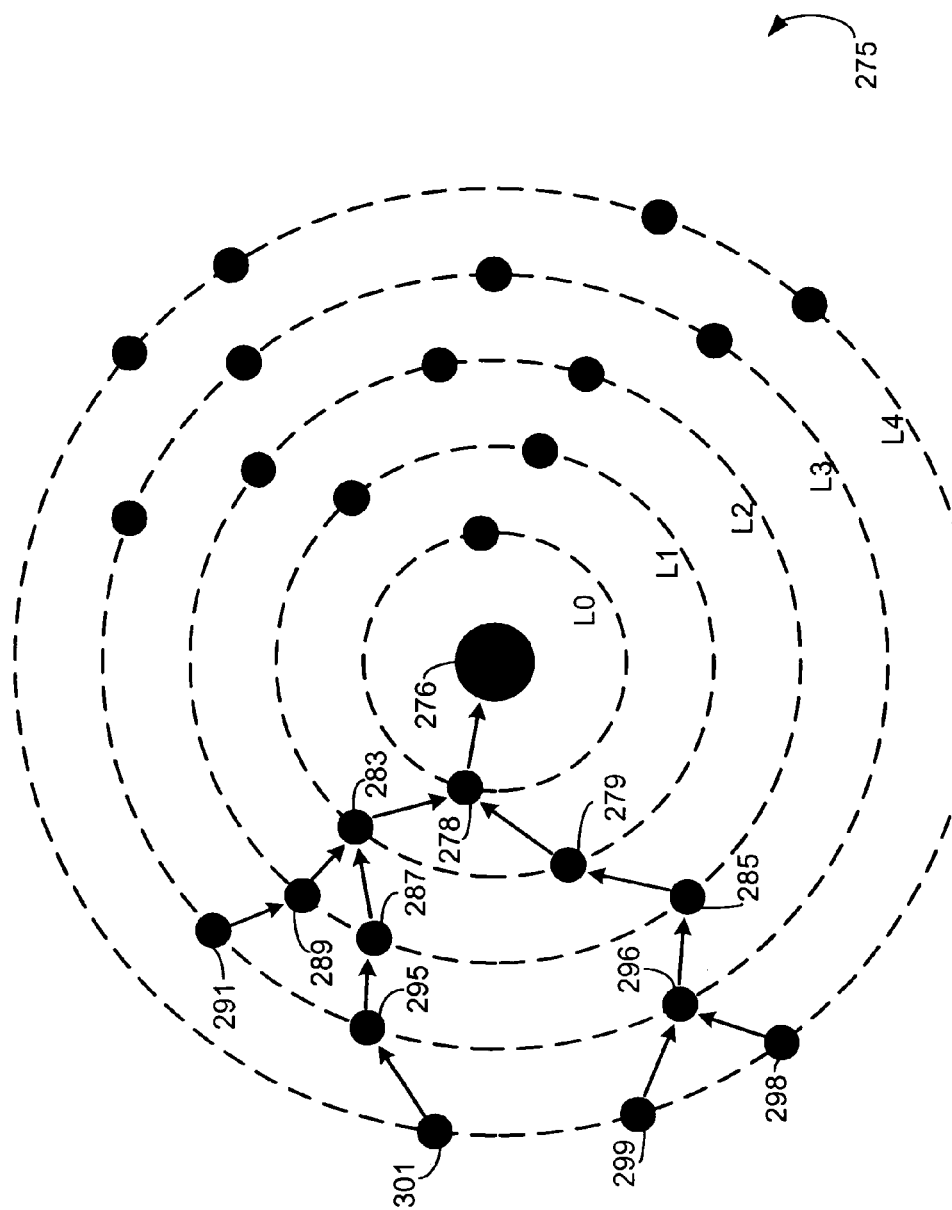
FIG. 15 is a diagram of a mesh network similar to the mesh network of FIG. 1 illustrating the alarm reporting process of FIGS. 14A and 14B.

FIG. 15 is a diagram of mesh network 275 comprised of access node 276 and assorted radio nodes on layers 0 through 4. In this nonlimiting example, radio nodes 278, 279, 283, 285, 287, 289, 291, 295, 296, 298, 299, and 301 experience alarm conditions in substantially the same period of time (within the predetermined deviation of time mentioned above). In this case, radio nodes 298 and 299 transmit alarm messages to radio node 296. Radio node 296 generates its own alarm message and includes in it information from radio nodes 298 and 299 that also transmit alarm messages. At that point, radio node 296 discards messages received from radio nodes 298 and 299 and transmits an alarm message to radio node 285. Radio node 285 receives the alarm message and listens for any other alarm message during its communication receive time. Upon receiving no other alarm messages, radio node 285 communicates its alarm message to radio node 279 after including its own information, which communicates an alarm message to radio node 278, after including its own information as well.

At the same time, in this nonlimiting example, radio node 301 communicates an alarm message to radio node 295, which is forwarded to radio node 283 via radio node 287. When radio node 283 monitors for other alarm messages during its communication receive time, it receives an alarm message from radio node 289 that includes an alarm condition for radio node 291. Thus, radio node 283 communicates this alarm condition to radio node 278 during the same period that radio node 279 communicates its alarm message to radio node 278.

Upon receiving alarm messages from radio nodes 279 and 283, radio node 278 generates its own alarm message and includes in it the address of all the radio nodes mentioned above in the message that is thereafter communicated to radio node 276. At that point, radio node 278 discards the messages received from radio nodes 279 and 283 and transmits the single alarm message to access node 276. Access node 276, upon receiving the alarm condition message from radio node 278, recognizes that the alarm condition is a large scale alarm sensed or detected at each of the radio nodes 278, 279, 283, 285, 287, 289, 291, 295, 296, 298, 299, and 301.

The access nodes of this disclosure may be configured to efficiently broadcast large sized data blocks to all the radio nodes of the mesh network. Thus, the access nodes may remotely upgrade each radio node's firmware or some communication parameter tables. A large size data block may be split into several messages of a maximum allowed size which may then be reassembled by the radio nodes. The layering scheme and communication timing schemes described above may be implemented to broadcast these messages.

Figure 16A:
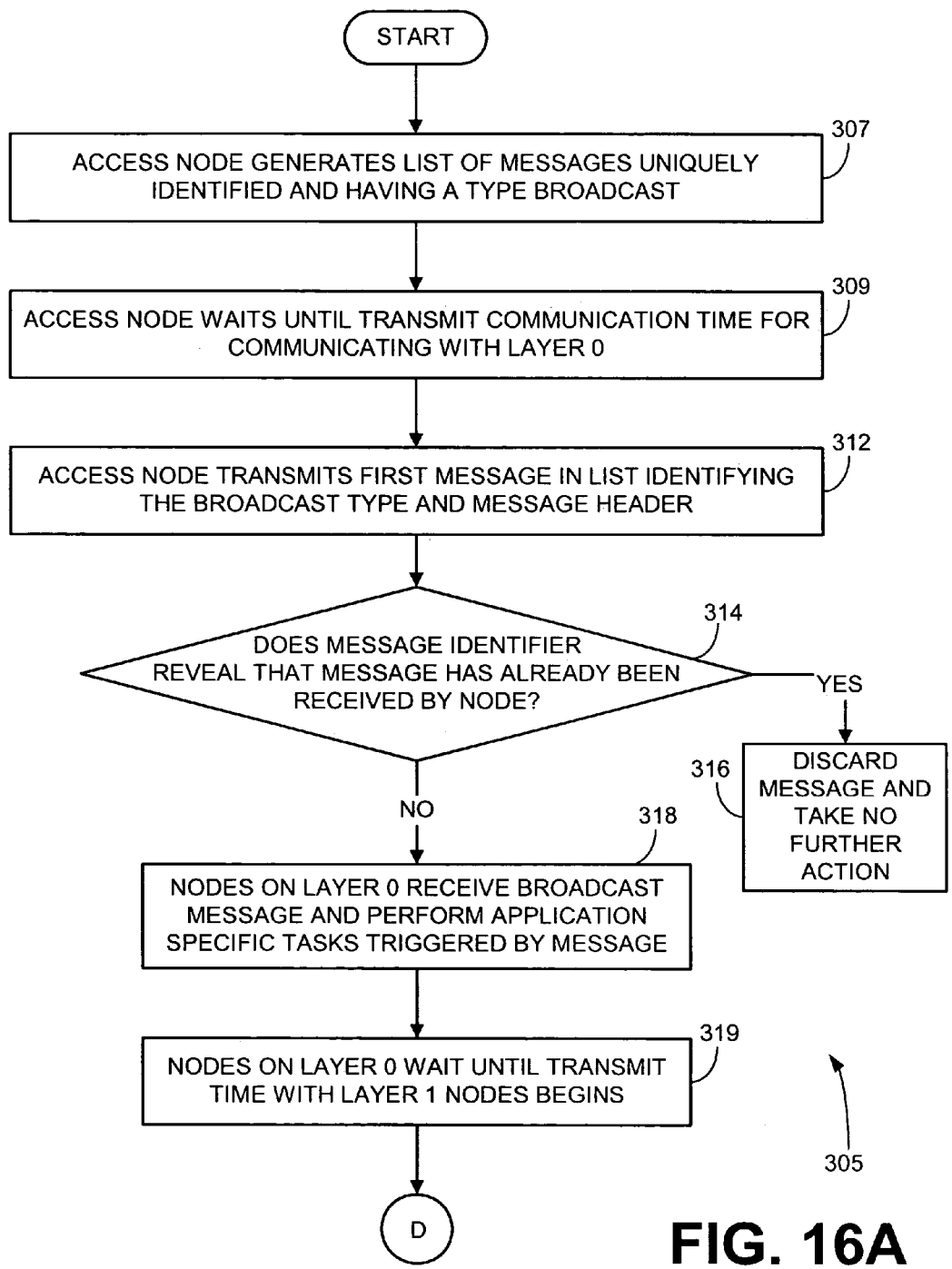
FIGS. 16A and 16B comprise flow chart diagrams of the process for communicating large scale broadcasts throughout the mesh network of FIG. 1.
Figure 16B:
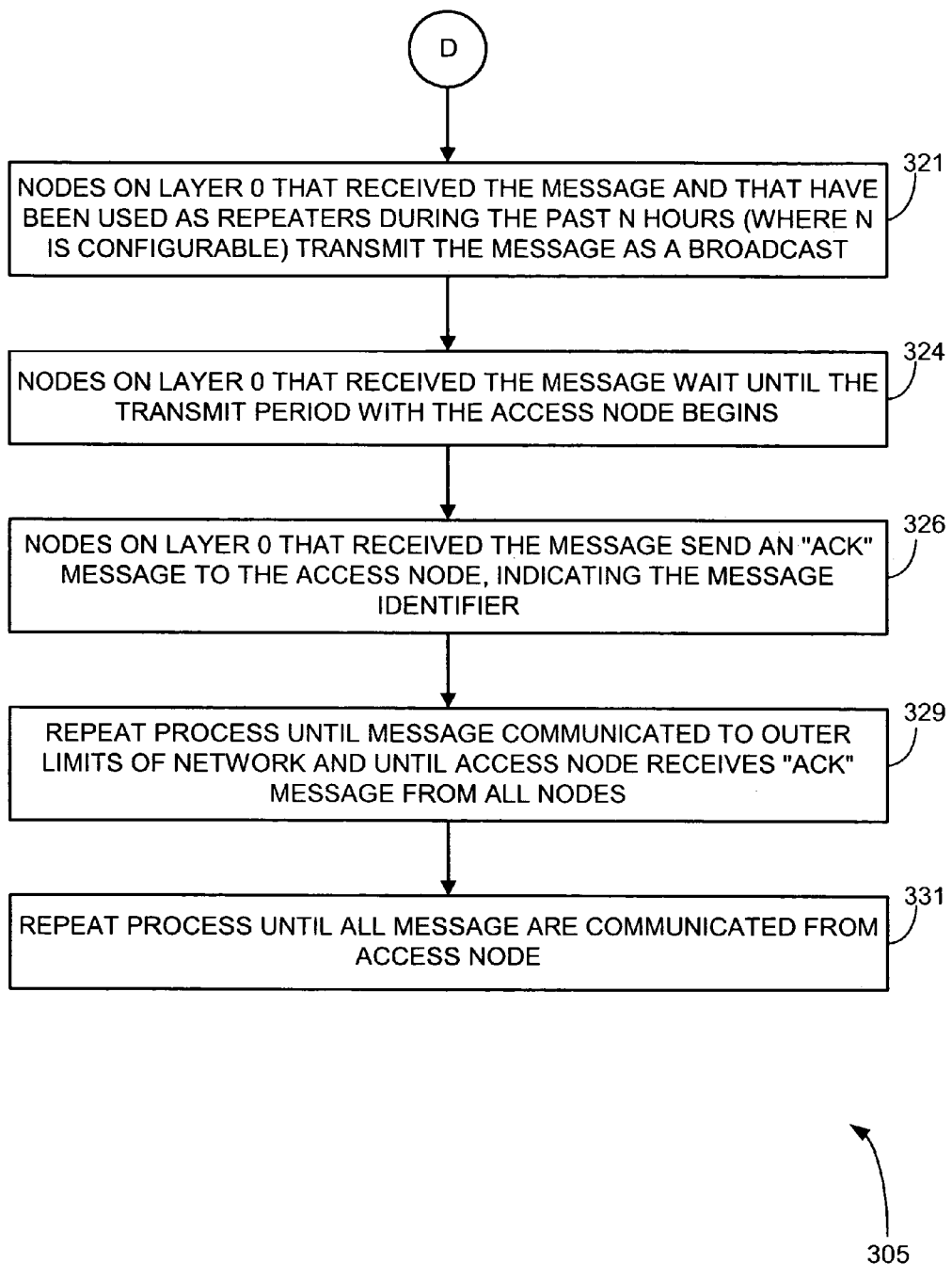

FIGS. 16A and 16B comprise flow chart illustrations of the process for communicating large scale broadcasts throughout the mesh network shown in FIG. 11. In step 307, the access node 175 (FIG. 11) may be configured to generate a list of messages uniquely identified and having a type broadcast. Thereafter, in step 309, the access node 175 waits until its transmit communication time for communicating with radio nodes on layer 0 (such as radio node 241 in FIG. 11). At that point, as in step 312, the access node 175 transmits the first message in this list, identifying the broadcast type in the message header. Radio node 241 on layer 0 receives the broadcast and performs the application specific task triggered by the respective message, if the message has not already been received by radio node 241. Thus, in step 314, radio node 241 on layer 0 determines whether or not the message has been received. If so, the radio node 241 discards the message in step 316 and takes no further action. In step 318, the radio node 241 on layer 0 performs the task if the message has not been received.

After step 318, that is, if the action indicated by the message is executed, radio node 241 on layer 0 waits until the transmission time $T_{XMT}$ arrives for communicating with radio nodes (such as radio nodes 246 and 247 of FIG. 11) on layer 1, as in step 319. When the transmit time $T_{XMT}$ arrives, radio node 241 on layer 0 that received the message and has been used as a repeater in the past X hours (where X is configurable), transmits the message as a broadcast, as shown in step 321 (FIG. 16B).

After completion of step 321, radio node 241 on layer 0 waits until the next transmit $T_{XMT}$ period with the access node 176 begins, as in step 324. In step 326, once the transmit time $T_{XMT}$ of the access node 176 begins, radio node 241 on layer 0 transmits a message back to the access node 176 an ACK message to the radio node indicating the message identifier. The ACK message communicated to the access node 176 indicates that the broadcast messages were received by the particular radio node (241 in FIG. 11) on layer 0 and thereafter broadcast to radio nodes on higher numbered layers.

In steps 329 and 331, the process is repeated for nodes on layers higher than layer 1, wherein the broadcast message is propagated throughout the mesh network to radio nodes on the outermost layers. As the message propagates throughout the mesh network, each radio node forwards an ACK message back to the access node indicating to the access node that the broadcast message was received by that particular radio node. This process is again repeated until the access node 176 receives ACK messages from each of the radio nodes in its mesh network 175.

As indicated above, one of the factors that affects the power number of a particular radio node is its battery status. As discussed above, a discharged battery results in a power number of 0, while a fully charged battery or constant power source results in at least a battery coefficient of 1.

Figure 17:
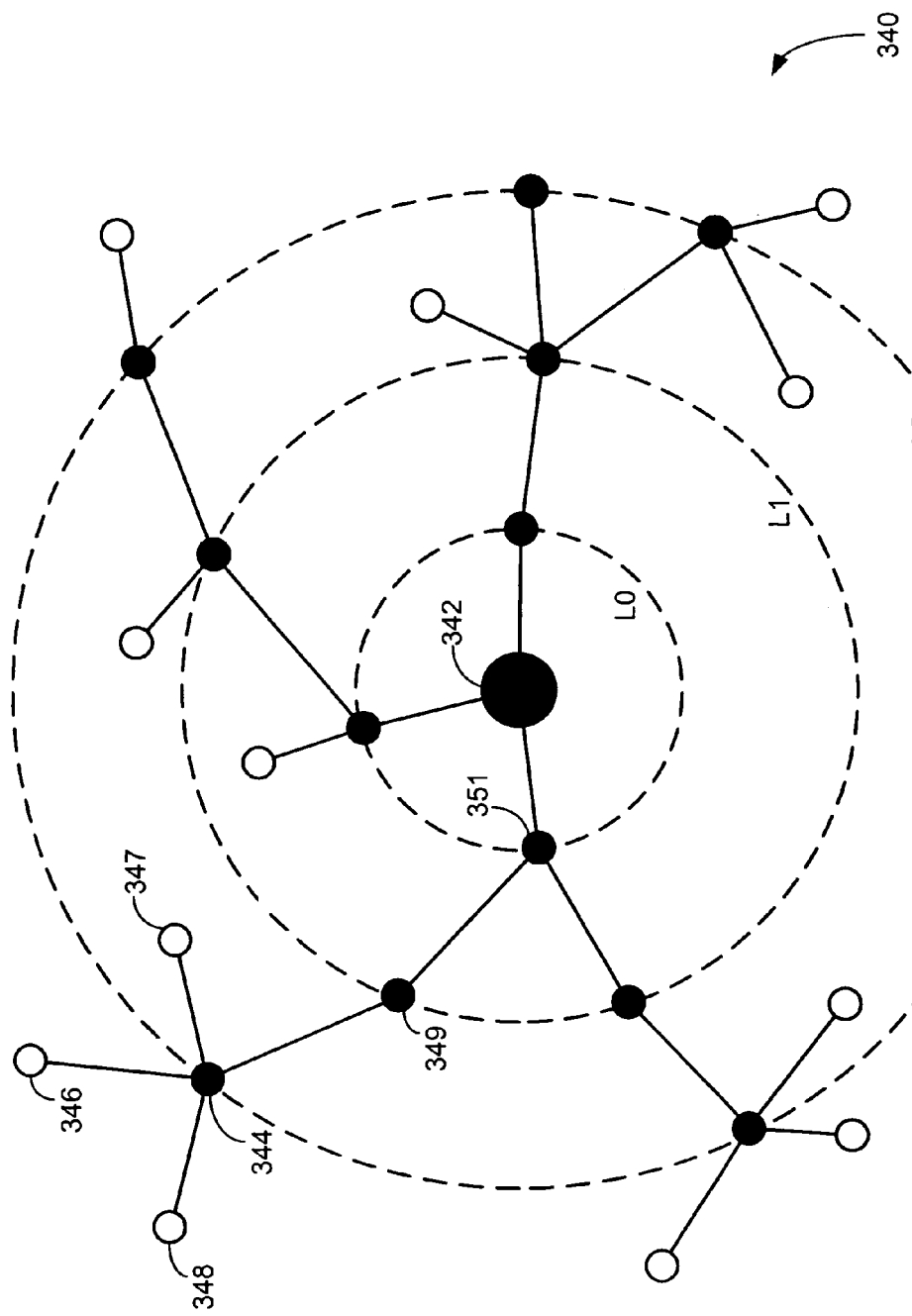
FIG. 17 is a diagram of a mesh network that is an alternative embodiment of the mesh network of FIG. 1.

Nevertheless, it is possible to extend the life of battery-powered devices when they are used in conjunction with AC powered radio nodes. FIG. 17 is a diagram of mesh network 340 which is an alternative embodiment of the mesh network of FIG. 1. In mesh network 340, access node 342 is coupled to various AC powered nodes on layers L0, L1, and L2. In this alternative embodiment, only the AC powered radio nodes, which are shown as the dark colored nodes, such as radio node 344, are allowed to function as repeaters. The AC powered radio nodes (such as radio node 344) arrange themselves on layers and construct repeating routes to the access node 342, as described above.

In this alternative embodiment, the battery-powered nodes, such as radio node 346 (and all non-darkened nodes), are prohibited from serving as repeaters. In at least one nonlimiting example, the power number for each of the battery-powered radio nodes, such as radio node 346, may be set to 0. In that case, the radio node 346 is disqualified from serving as a repeater, as described above. In having a power number of 0, the radio nodes cannot serve as repeaters and do not arranged themselves on layers, as the AC powered nodes such as radio node 344.

Each battery-powered radio node, such as radio node 346, is configured to communicate directly with at least one AC powered radio node, such as radio node 344. Accordingly and in this nonlimiting example, battery-powered radio nodes 346, 347, and 348 communicate with AC powered node 344 on logical layer 2. So even though radio node 346 does not serve as a repeater, it is still able to communicate with access node 342 via a repeater route comprising radio nodes 344, 349, and 351. In this way, battery-powered radio nodes 346, 347, and 348 act as satellites for AC powered radio node 344.

Also in this nonlimiting example, the AC powered radio nodes may maintain receiving mode even during sleep time, as described above and as shown in FIG. 10, since power consumption is not an issue for these nodes. Consequently, the battery powered radio nodes, such as radio node 346, wake up periodically and initiate communication with their respective AC powered radio node repeater, which in this case is radio node 344. As stated above, radio node repeater 344 receives the message transmitted from the battery-powered radio node 344 and forwards the message to access node 342.

In this alternative embodiment, as shown in FIG. 17, the battery life of the battery-powered nodes, such as radio node 346, may be greatly extended. Thus, this embodiment may extend the time for battery replacement, which may be expensive in a large mesh network.

Figure 18:
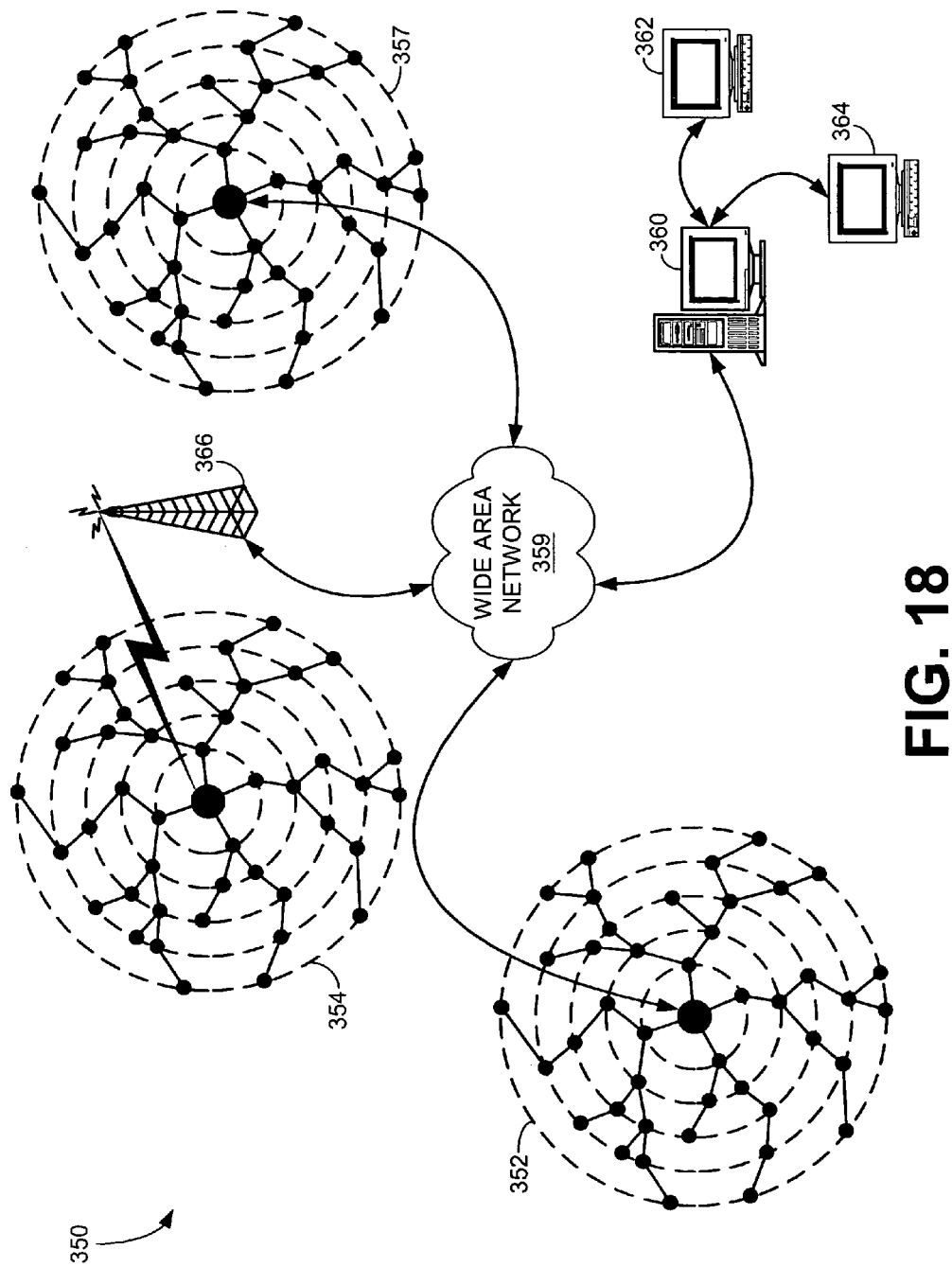
FIG. 18 is a diagram of multiple mesh networks similar to the mesh network of FIG. 1 coupled to a back end computer via a wide end network.

FIG. 18 is a diagram of multiple mesh networks similar to the mesh network 10 of FIG. 1 coupled to a back end system via a wide area network. Mesh networks 352, 354, and 357 may represent three separate mesh networks that may be geographically separated from each other but yet a part of the same network communicating back to server 360 across wide area network 359, such as the Internet. More specifically, mesh network 352 may include an access node and a plurality of radio nodes which are each coupled to, as a nonlimiting example, a power utility meter. Thus, the power utility meters sense power consumption and communicate that data to the access node in mesh network 352. Each radio node periodically communicates power consumption data to the access node of mesh network 352, which is then forwarded by any one of a number of communication links, as one of ordinary skill in the art would know, to wide area network 359. Server 360 is likewise coupled to wide area network 359 and may receive the data communicated by the access node in mesh network 352.

In FIG. 18, mesh network 352 may, as described above, be associated with radio nodes coupled to power utility meters. Likewise, mesh network 354 may include an access node with a plurality of radio nodes coupled to gas meters in a different geographical area. Furthermore, mesh network 357 may include an access node with a plurality of radio nodes wherein some radio nodes are coupled to gas meters, some coupled to electric meters, and others coupled to water meters, but yet all a part of mesh network 357.

The radio nodes of FIG. 18 therefore may be coupled to any type of sensor or other device that provides a signal to the radio node for communicating data back to an access node for ultimate transmission to the server 360 across wide area network 359. As an alternate embodiment, one or more of the radio nodes as shown in FIG. 18 may also be coupled to an actuator such as a pump or other device to be controlled. Thus, a signal communicated from the computer server 360 and across wide area network 359 may be communicated to an access node such as in mesh network 352 for controlling one or more of the radio nodes in mesh network 352.

Mesh network 354, as a nonlimiting example, may be coupled to wide area network 359 by wireless means according to tower 366, which may be configured according to one or more wireless standards, as one of ordinary skill in the art would know. As a nonlimiting example, in areas where wired communication links to wide area network 359 are unavailable, a wireless communication scheme such as implemented by tower 366 may provide a wireless communication path to the access node of mesh network 354.

In addition to server 360, one or more computers 362, 364 may also be coupled to server 360 for assisting in data collection analysis and control applications.

Figure 19:
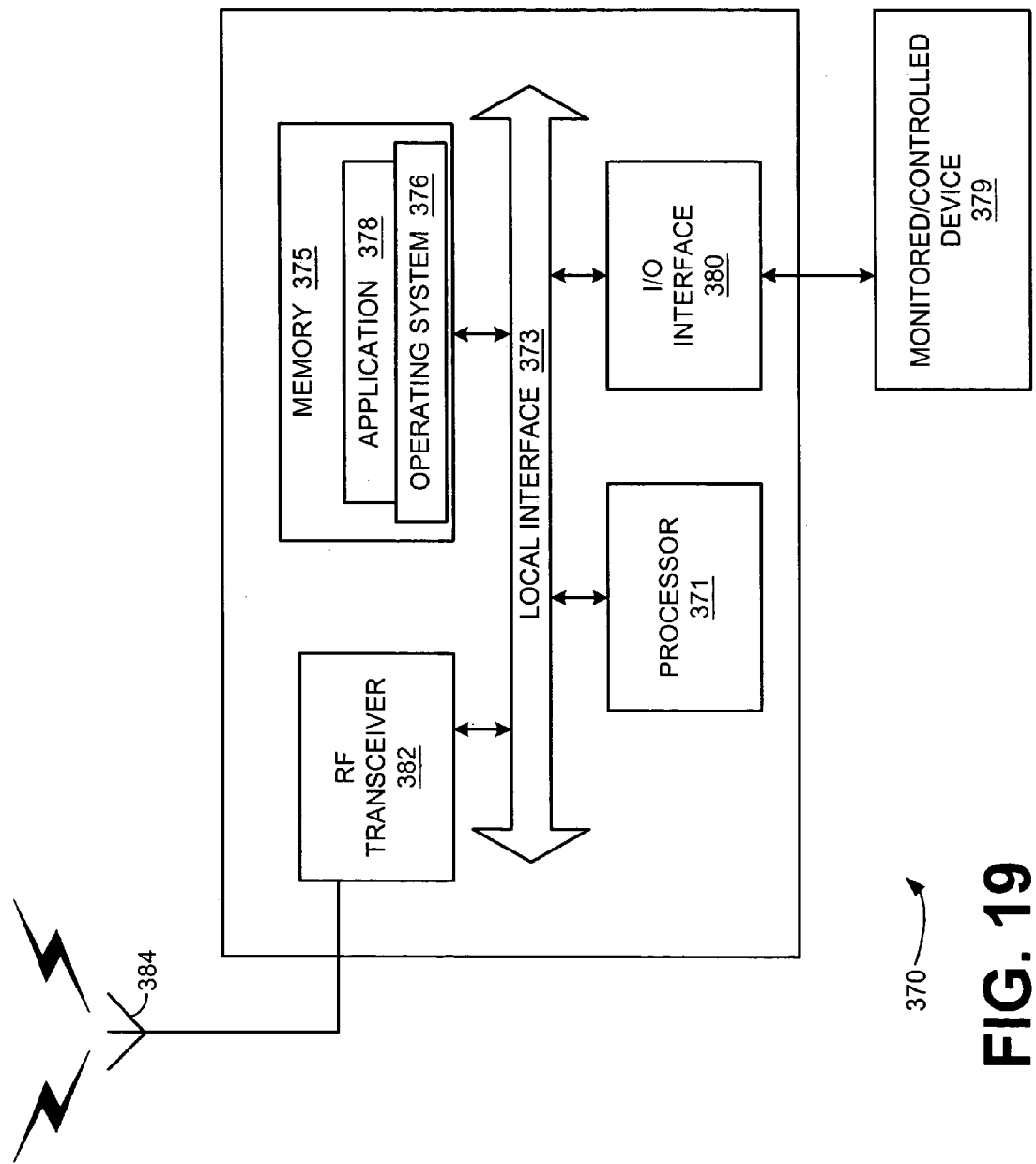
FIG. 19 is a diagram of an exemplary radio node as shown and described in this disclosure.

FIG. 19 is a diagram 370 of an exemplary radio node as shown and described in this disclosure. One of ordinary skill in the art would know that multiple configurations and implementations of radio nodes may suffice, and that this illustration is merely a nonlimiting example of one such implementation. Thus, as a nonlimiting example, radio node 370 may be comprised of the processor 371 that communicates by a local interface 373 with memory 375. An operating system 376 and application specific software 378 may be contained in memory 375. The application specific software 378 may include one or more of the processes described above and shown in the figures.

As indicated above, a radio node may receive a signal input from another device, such as an electric, gas, or water meter, or can send control signals to an actuator, which may be represented as device 379 of FIG. 19. Accordingly, a signal is communicated from device 379 to the interface 380 for processing by processor 371. Radio node 370 also includes RF transceiver 382 which may receive and transmit communications with other radio nodes and/or an access node of the mesh network via antenna 384.

Figure 20:
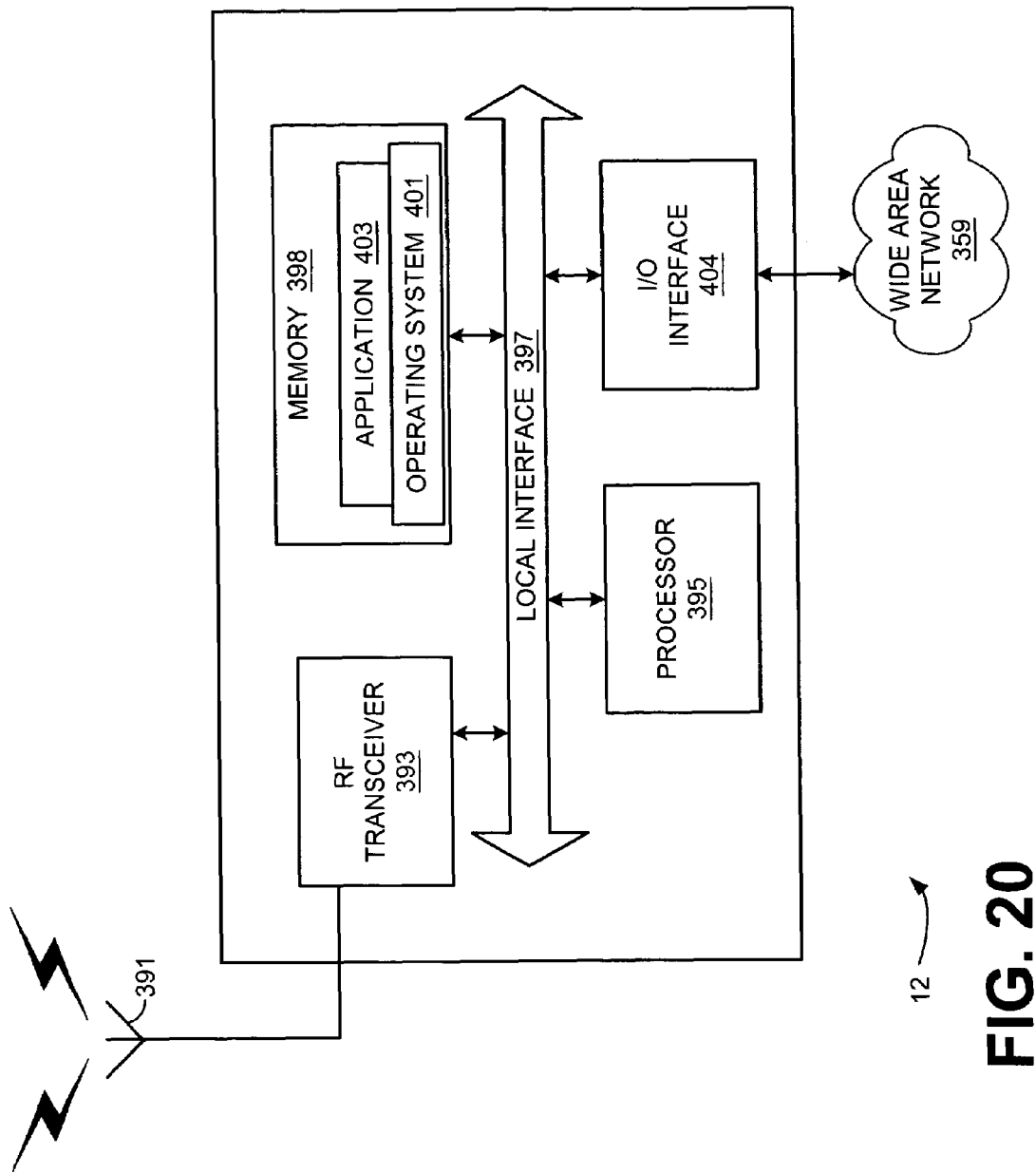
FIG. 20 is a nonlimiting exemplary diagram of an access node as shown and described in this disclosure.

FIG. 20 is a nonlimiting exemplary diagram of an access node 12 as shown and described in this disclosure. Access node 12 is comprised of the processor 395 that communicates by a local interface 397 with memory 398, which may include an operating system 401 and application specific software 403. Access node 12 includes an RF transceiver 393 that communicates via antenna 391 with one or more radio nodes, as shown in FIG. 19. Access node 12 also includes an interface 404 for communicating over a wide area network 359 with one or more devices, such as server 360 as shown in FIG. 18.

It should be emphasized that the above-described embodiments and nonlimiting examples are merely possible examples of implementations, merely set forth for a clear understanding of the principles disclosed herein. Many variations and modifications may be made to the above-described embodiment(s) and nonlimiting examples without departing substantially from the spirit and principles disclosed herein. All such modifications and variations are intended to be included herein within the scope of this disclosure and protected by the following claims.

We claim:

1. A method for a radio node coupled to a sensing device or an actuator to consolidate messages in a network of radio nodes that communicate data to an access node coupled to a computer, comprising the steps of:

receiving a plurality of messages during a communication receive period at a first radio node, the plurality of messages received from a plurality of radio nodes logically further from the access node than the first radio node;

constructing a consolidated message containing each of the plurality of messages received from the plurality of radio nodes logically further from the access node than the first radio node;

transmitting wirelessly the consolidated message from the first radio node to another radio node logically closer to the access node or directly to the access node if the access node is within the transmission range of the first radio node during a communication transmit time for the first radio node, wherein each of the plurality of messages are extracted from the consolidated message upon receipt at the access node; and discarding at least one of the plurality of messages received after constructing the consolidated message, wherein a second radio node logically closer to the access node than the first radio node creates a further consolidated message containing the consolidated message transmitted from the first radio node and one or more additional messages received from other radio nodes logically further from the access node than the second radio node.

2. The method of claim 1,
wherein the sensing devices is a utility meter and each of the plurality of messages contain data corresponding to utility consumption information for the utility meter coupled to the radio node logically further from the access node than the first radio node that transmits to the first radio node.

3. A method for an access node coupled to a computer to consolidate outbound messages to a plurality of radio nodes in a network of radio nodes each coupled to a sensing device or an actuator, comprising the steps of:
determining whether two or more original outbound messages addressed to separate destination radio nodes contain one or more common route segments;
constructing a consolidated outbound message containing each original outbound message that is addressed to a separate radio node and has a common route segment with another original outbound message, wherein the consolidated message contains a common route and a remaining route portion for each original outbound message that is part of the consolidated outbound message;
transmitting wirelessly the consolidated outbound message along the common route to a radio node that is a last radio node in the common route;
splitting the consolidated message at the last radio node in the common route into the original outbound messages; and
transmitting wirelessly the original outbound messages from the last radio node in the common route to each of the separate destination radio nodes,
wherein the consolidated message is transmitted during an outbound transmit time by a radio node that comprises part of the common route to a radio node that is on a logical layer that is logically further from the access node.

4. The method of claim 3, wherein the access node transmits one consolidated message to a particular radio node on a first logical layer of radio nodes within the broadcast range of the access node for each additional radio node that utilizes the particular radio node on a first logical layer as a repeater.

5. The method of claim 3, further comprising the step of:
configuring each radio node to examine the consolidated message to determine whether the consolidated message contains an indicator indicating that the examining radio node is the last radio node in the common route.

6. A method for an access node coupled to a computer to consolidate outbound messages to a plurality of radio nodes in a network of radio nodes each coupled to a sensing device or an actuator, comprising the steps of:
determining whether two or more original outbound messages addressed to separate destination radio nodes contain one or more common route segments;
constructing a consolidated outbound message containing each original outbound message that is addressed to a separate radio node and has a common route segment with another original outbound message, wherein the consolidated message contains a remaining route portion for each original outbound message that is part of the consolidated outbound message;
transmitting wirelessly the consolidated outbound message along the common route to a radio node that is a last radio node in the common route;
splitting the consolidated message at the last radio node in the common route into two or more split messages, wherein one or more of the split messages contains a plurality of original outbound messages;
transmitting wirelessly the one or more of the split messages containing a plurality of original messages from the last radio node in the common route to a last radio node in a continued common route;
separating the one or more of the split messages containing a plurality of original messages at the last radio node in the continued common route into the original outbound messages; and
transmitting wirelessly the original outbound messages from the last radio node in the continued common route to each of the separate destination radio nodes,
wherein the consolidated message is transmitted during an outbound transmit time by a radio node that comprises part of the common route to a radio node that is on a logical layer that is logically further from the access node.

* * * * *